(12) United States Patent
Jung et al.

(10) Patent No.: US 8,096,882 B2
(45) Date of Patent: Jan. 17, 2012

(54) RISK MITIGATION IN A VIRTUAL WORLD

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 516 days.

(21) Appl. No.: 11/191,252

(22) Filed: Jul. 27, 2005

(65) Prior Publication Data
US 2006/0178217 A1  Aug. 10, 2006

Related U.S. Application Data

(63) Continuation-in-part of application No. 11/051,514, filed on Feb. 4, 2005, now Pat. No. 7,958,047, and a continuation-in-part of application No. 11/069,905, filed on Feb. 28, 2005, now Pat. No. 7,774,275, and a continuation-in-part of application No. 11/096,265, filed on Mar. 30, 2005, and a continuation-in-part of application No. 11/191,248, filed on Jul. 27, 2005, and a continuation-in-part of application No. 11/191,233, filed on Jul. 27, 2005.

(51) Int. Cl.
| A63F 9/24 | (2006.01) |
| A63F 13/00 | (2006.01) |
| G06F 17/00 | (2006.01) |
| G06F 19/00 | (2006.01) |

(52) U.S. Cl. ............... 463/42; 463/25; 463/29; 463/30; 463/31; 273/461; 705/35; 705/36 R; 705/37; 902/23

(58) Field of Classification Search ............ 463/1, 9–13, 463/16, 20, 25, 29, 40–42, 30–33; 273/145 R, 273/147, 141 A, 454–456, 460–461; 705/35, 705/36 R, 37, 14, 26, 42, 77; 902/10, 23; 709/203–207, 217–219, 225, FOR. 106, FOR. 115, 709/FOR. 122, FOR. 130, FOR. 131, FOR. 132, 709/FOR. 141, FOR. 148, FOR. 149, FOR. 153; 340/7.1, 7.2, 7.21, 7.28, 311.1, 311.2, 426.21, 340/572, 825.29, 825.44; 715/744, 758; 704/E15.047; A63F 9/24, 13/00; G06F 17/00, G06F 19/00

See application file for complete search history.

(56) References Cited

U.S. PATENT DOCUMENTS
4,569,526 A   2/1986 Hamilton
(Continued)

FOREIGN PATENT DOCUMENTS
EP   1 326 170 A1   7/2003
(Continued)

OTHER PUBLICATIONS

LucasArts; "Star Wars Galaxies: An Empire Divided"; Jun. 26, 2003. Selected pages. LucasFilm Etertainment Company Ltd.*
(Continued)

Primary Examiner — Arthur O. Hall

(57) ABSTRACT

Embodiments include an apparatus, device, system, computer-program product, and method. In an embodiment, a system includes a computer-simulated environment wherein a participant is able to take part. The system also includes a risk management element of the computer-simulated environment, and a computer storage medium operable to save a record of the arrangement.

39 Claims, 24 Drawing Sheets

U.S. PATENT DOCUMENTS

| | | | |
|---|---|---|---|
| 5,008,853 A | 4/1991 | Bly et al. | |
| 5,192,854 A | 3/1993 | Counts | |
| 5,203,848 A | 4/1993 | Wang | |
| 5,220,657 A | 6/1993 | Bly et al. | |
| 5,241,466 A | 8/1993 | Perry et al. | |
| 5,261,045 A | 11/1993 | Scully et al. | |
| 5,323,315 A | 6/1994 | Highbloom | |
| 5,333,868 A | 8/1994 | Goldfarb | |
| 5,337,407 A | 8/1994 | Bates et al. | |
| 5,388,196 A | 2/1995 | Pajak et al. | |
| 5,513,129 A | 4/1996 | Bolas et al. | |
| 5,643,088 A | 7/1997 | Vaughn et al. | |
| 5,651,117 A | 7/1997 | Arbuckle | |
| 5,696,965 A | 12/1997 | Dedrick | |
| 5,788,574 A | 8/1998 | Ornstein et al. | |
| 5,791,991 A | 8/1998 | Small | |
| 5,795,228 A | 8/1998 | Trumbull et al. | |
| 5,802,296 A | 9/1998 | Morse et al. | |
| 5,806,045 A | 9/1998 | Biorge et al. | |
| 5,808,612 A | 9/1998 | Merrick et al. | |
| 5,823,879 A * | 10/1998 | Goldberg et al. | 463/42 |
| 5,850,442 A | 12/1998 | Muftic | |
| 5,870,030 A | 2/1999 | DeLuca et al. | |
| 5,884,029 A | 3/1999 | Brush, II et al. | |
| 5,890,995 A | 4/1999 | Bobick et al. | |
| 5,926,179 A | 7/1999 | Matsuda et al. | |
| 5,937,391 A | 8/1999 | Ikeda et al. | |
| 5,938,196 A * | 8/1999 | Antoja | 273/143 C |
| 5,946,664 A | 8/1999 | Ebisawa | |
| 5,956,038 A | 9/1999 | Rekimoto | |
| 5,956,700 A | 9/1999 | Landry | |
| 5,964,660 A * | 10/1999 | James et al. | 463/1 |
| 5,964,661 A | 10/1999 | Dodge | |
| 5,978,780 A | 11/1999 | Watson | |
| 5,983,003 A * | 11/1999 | Lection et al. | 709/202 |
| 5,983,196 A | 11/1999 | Wendkos | |
| 6,009,458 A | 12/1999 | Hawkins et al. | |
| 6,024,643 A | 2/2000 | Begis | |
| 6,036,601 A | 3/2000 | Heckel | |
| 6,057,856 A | 5/2000 | Miyashita et al. | |
| 6,106,395 A | 8/2000 | Begis | |
| 6,119,229 A | 9/2000 | Martinez et al. | |
| 6,135,646 A | 10/2000 | Kahn et al. | |
| 6,152,856 A | 11/2000 | Studor et al. | |
| 6,246,991 B1 | 6/2001 | Abe et al. | |
| 6,251,017 B1 | 6/2001 | Leason et al. | |
| 6,253,193 B1 | 6/2001 | Ginter et al. | |
| 6,267,675 B1 | 7/2001 | Lee | |
| 6,298,374 B1 | 10/2001 | Sasaki et al. | |
| 6,330,547 B1 | 12/2001 | Martin | |
| 6,332,127 B1 | 12/2001 | Bandera et al. | |
| 6,375,466 B1 | 4/2002 | Juranovic | |
| 6,450,407 B1 | 9/2002 | Freeman et al. | |
| 6,467,686 B1 | 10/2002 | Guthrie et al. | |
| 6,476,830 B1 | 11/2002 | Farmer et al. | |
| 6,505,773 B1 | 1/2003 | Palmer et al. | |
| 6,523,829 B1 | 2/2003 | Walker et al. | |
| 6,545,682 B1 | 4/2003 | Ventrella et al. | |
| 6,591,250 B1 | 7/2003 | Johnson et al. | |
| 6,609,970 B1 | 8/2003 | Luciano, Jr. | |
| 6,616,533 B1 | 9/2003 | Rashkovskiy | |
| 6,625,578 B2 | 9/2003 | Spaur et al. | |
| 6,632,142 B2 | 10/2003 | Keith | |
| 6,643,751 B2 | 11/2003 | Rosenquist et al. | |
| 6,663,105 B1 | 12/2003 | Sullivan et al. | |
| 6,672,961 B1 | 1/2004 | Uzun | |
| 6,726,427 B2 * | 4/2004 | Jarvis et al. | 273/292 |
| 6,729,884 B1 | 5/2004 | Kelton et al. | |
| 6,769,691 B1 | 8/2004 | Kim | |
| 6,791,549 B2 | 9/2004 | Hubrecht et al. | |
| 6,793,580 B2 | 9/2004 | Sinclair et al. | |
| 6,850,643 B1 | 2/2005 | Smith et al. | |
| 6,884,166 B2 | 4/2005 | Leen et al. | |
| 6,935,952 B2 | 8/2005 | Walker et al. | |
| 6,950,169 B2 | 9/2005 | Ma et al. | |
| 6,954,728 B1 | 10/2005 | Kusumoto et al. | |
| 6,965,868 B1 | 11/2005 | Bednarek | |
| 7,020,632 B1 | 3/2006 | Kohls et al. | |
| 7,054,830 B1 | 5/2006 | Eggleston et al. | |
| 7,055,740 B1 | 6/2006 | Schultz et al. | |
| 7,115,034 B2 | 10/2006 | Kuwahara | |
| 7,124,088 B2 | 10/2006 | Bauer et al. | |
| 7,147,562 B2 | 12/2006 | Ohara et al. | |
| 7,169,051 B1 | 1/2007 | Mossbarger | |
| 7,169,501 B2 | 1/2007 | Suganuma et al. | |
| 7,228,260 B2 | 6/2007 | Fujino et al. | |
| 7,249,139 B2 | 7/2007 | Chuah et al. | |
| 7,275,987 B2 | 10/2007 | Shimakawa et al. | |
| 7,289,130 B1 | 10/2007 | Satoh et al. | |
| 7,319,992 B2 | 1/2008 | Gaos | |
| 7,333,943 B1 * | 2/2008 | Charuk et al. | 705/26.1 |
| 7,373,377 B2 | 5/2008 | Altieri | |
| 7,455,221 B2 * | 11/2008 | Sheaffer | 235/380 |
| 7,483,857 B2 * | 1/2009 | Bansal et al. | 705/39 |
| 7,494,416 B2 * | 2/2009 | Walker et al. | 463/25 |
| 7,523,486 B1 | 4/2009 | Turner | |
| 7,593,864 B2 | 9/2009 | Shuster | |
| 7,614,944 B1 | 11/2009 | Hughes et al. | |
| 7,620,592 B2 * | 11/2009 | O'Mara et al. | 705/38 |
| 7,672,884 B2 * | 3/2010 | Schuster et al. | 705/35 |
| 7,690,997 B2 | 4/2010 | Van Luchene et al. | |
| 7,698,178 B2 | 4/2010 | Chu | |
| 7,722,453 B2 | 5/2010 | Lark et al. | |
| 2001/0027430 A1 | 10/2001 | Sabourian | |
| 2001/0037316 A1 | 11/2001 | Shiloh | |
| 2001/0040341 A1 * | 11/2001 | Kamille | 273/138.1 |
| 2001/0047328 A1 | 11/2001 | Triola | |
| 2001/0056383 A1 | 12/2001 | Shuster | |
| 2001/0056399 A1 | 12/2001 | Saylors | |
| 2002/0013722 A1 | 1/2002 | Kanaga | |
| 2002/0016655 A1 | 2/2002 | Joao | |
| 2002/0019744 A1 | 2/2002 | Yamamoto | |
| 2002/0022516 A1 | 2/2002 | Forden | |
| 2002/0029252 A1 | 3/2002 | Segan et al. | |
| 2002/0032037 A1 | 3/2002 | Segawa | |
| 2002/0073043 A1 | 6/2002 | Herman et al. | |
| 2002/0087465 A1 | 7/2002 | Ganesan et al. | |
| 2002/0090985 A1 | 7/2002 | Tochner et al. | |
| 2002/0091635 A1 | 7/2002 | Dilip et al. | |
| 2002/0095375 A1 | 7/2002 | Taneda et al. | |
| 2002/0095523 A1 * | 7/2002 | Shimakawa et al. | 709/316 |
| 2002/0113809 A1 | 8/2002 | Akazawa et al. | |
| 2002/0120554 A1 | 8/2002 | Vega | |
| 2002/0125312 A1 | 9/2002 | Ogilvie | |
| 2002/0128952 A1 | 9/2002 | Melkomian et al. | |
| 2002/0138445 A1 | 9/2002 | Laage et al. | |
| 2002/0142842 A1 * | 10/2002 | Easley et al. | 463/42 |
| 2002/0152155 A1 | 10/2002 | Greenwood et al. | |
| 2002/0152156 A1 | 10/2002 | Tyson-Quah | |
| 2002/0174055 A1 | 11/2002 | Dick et al. | |
| 2002/0178120 A1 | 11/2002 | Reid et al. | |
| 2002/0188760 A1 * | 12/2002 | Kuwahara | 709/246 |
| 2002/0198735 A1 | 12/2002 | Tobert | |
| 2003/0014266 A1 | 1/2003 | Brown et al. | |
| 2003/0014423 A1 | 1/2003 | Chuah et al. | |
| 2003/0036987 A1 | 2/2003 | Omiya | |
| 2003/0037101 A1 | 2/2003 | Torabi | |
| 2003/0046689 A1 | 3/2003 | Gaos | |
| 2003/0064807 A1 * | 4/2003 | Walker et al. | 463/42 |
| 2003/0069825 A1 | 4/2003 | Tendon et al. | |
| 2003/0097331 A1 | 5/2003 | Cohen | |
| 2003/0105688 A1 | 6/2003 | Brown et al. | |
| 2003/0105705 A1 | 6/2003 | Eyre | |
| 2003/0107173 A1 | 6/2003 | Satloff et al. | |
| 2003/0115132 A1 | 6/2003 | Iggland | |
| 2003/0118575 A1 | 6/2003 | Grob et al. | |
| 2003/0144940 A1 | 7/2003 | Kochansky et al. | |
| 2003/0154092 A1 | 8/2003 | Bouron et al. | |
| 2003/0155715 A1 | 8/2003 | Walker et al. | |
| 2003/0187768 A1 | 10/2003 | Ryan et al. | |
| 2003/0216184 A1 | 11/2003 | Kigoshi | |
| 2003/0220884 A1 | 11/2003 | Choi et al. | |
| 2004/0051718 A1 | 3/2004 | Bennett et al. | |
| 2004/0058731 A1 | 3/2004 | Rossides | |
| 2004/0073488 A1 | 4/2004 | Etuk et al. | |
| 2004/0082377 A1 | 4/2004 | Seelig et al. | |
| 2004/0128518 A1 | 7/2004 | Cavers et al. | |

| | | | |
|---|---|---|---|
| 2004/0133472 | A1 | 7/2004 | Leason et al. |
| 2004/0148221 | A1 | 7/2004 | Chu |
| 2004/0158492 | A1 | 8/2004 | Lopez et al. |
| 2005/0010534 | A1 | 1/2005 | Groz |
| 2005/0021472 | A1 | 1/2005 | Gettman et al. |
| 2005/0043094 | A1 | 2/2005 | Nguyen et al. |
| 2005/0060260 | A1 | 3/2005 | Masuda et al. |
| 2005/0137015 | A1 | 6/2005 | Rogers et al. |
| 2005/0137904 | A1 | 6/2005 | Lane et al. |
| 2005/0148388 | A1 | 7/2005 | Vayra et al. |
| 2005/0153766 | A1 | 7/2005 | Harmon |
| 2005/0153771 | A1* | 7/2005 | Ghela ............................. 463/17 |
| 2005/0170883 | A1* | 8/2005 | Muskin .......................... 463/25 |
| 2005/0177492 | A1 | 8/2005 | Camping |
| 2005/0182693 | A1 | 8/2005 | Alivandi |
| 2005/0192071 | A1 | 9/2005 | Matsuno et al. |
| 2005/0203835 | A1 | 9/2005 | Nhaissi et al. |
| 2005/0216346 | A1 | 9/2005 | Kusumoto et al. |
| 2005/0235008 | A1 | 10/2005 | Camping et al. |
| 2005/0288963 | A1 | 12/2005 | Parrish |
| 2006/0026044 | A1* | 2/2006 | Smith, II .......................... 705/4 |
| 2006/0080613 | A1 | 4/2006 | Savant |
| 2006/0111934 | A1* | 5/2006 | Meggs .............................. 705/2 |
| 2006/0206376 | A1 | 9/2006 | Gibbs et al. |
| 2006/0224480 | A1 | 10/2006 | Bent et al. |
| 2006/0234795 | A1* | 10/2006 | Dhunjishaw et al. ........... 463/42 |
| 2007/0061202 | A1 | 3/2007 | Ellis et al. |
| 2007/0087820 | A1 | 4/2007 | Van Luchene et al. |
| 2007/0087822 | A1 | 4/2007 | Van Luchene |
| 2007/0117615 | A1 | 5/2007 | Van Luchene |
| 2007/0179867 | A1 | 8/2007 | Glazer et al. |
| 2008/0139318 | A1 | 6/2008 | Van Luchene et al. |
| 2009/0006124 | A1 | 1/2009 | Sinclair et al. |
| 2009/0204420 | A1 | 8/2009 | Ganz |

FOREIGN PATENT DOCUMENTS

| | | | |
|---|---|---|---|
| JP | 11143944 | A | 5/1999 |
| WO | WO 02/20111 | A2 | 3/2002 |
| WO | WO 02/067178 | A1 | 8/2002 |
| WO | WO 02/077758 | A2 | 10/2002 |
| WO | WO 2005/064502 | A1 | 7/2005 |

OTHER PUBLICATIONS

Nobody Fugazi (Taran Rampersad), The Evolution of Business in Second Life, Feb. 28, 2000, Avvenimenti Iblei Magazine Online—Business & SL, n. 4, pp. 1-4.*

"About Deposits and Withdrawals"; Project Entropia; pp. 1; located at http://www.project-entropia.com/Content.ajp?id=1303; printed on Jan. 27, 2005.

"About Project Entropia"; Project Entropia; pp. 1; located at http://www.project-entropia.com/about/Index.ajp; printed on Jan. 27, 2005.

"Bank Account Game"; pp. 1-2; located at http://www.educational-learninggames.com/bank-account-game.asp; Educational Learning Games.com; printed Dec. 10, 2004.

Becker, David; "Real cash for virtual goods"; CNET News.Com; bearing a date of Feb. 8, 2005; pp. 1-4; CNET Networks, Inc.; located at http://news.com.com/2102-1043_3-5566704.html?tag=st.util.print; printed on Feb. 8, 2005.

Book, Betsy; "Moving Beyond the Game: Social Virtual Worlds"; State of Play 2 Conference, Nov. 1804; Cultures of Play Panel; pp. 1-13; printed on Jul. 14, 2005.

"Charge It! Math and Money Board Games"; pp. 1-2; located at http://www.educationallearninggames.com/charge-it-board-game-money-board-game.asp; Educational Learning Games.com; printed on Jan. 27, 2005.

Cringely, Robert X.; "The Wild Ones, The Best Way to Protect Sales of Virtual Goods Can Be Found Inside the Game, Itself"; bearing a date of May 13, 2004; pp. 1-3; located at http://www.pbs.org/cringley/pulpit/pulpit20040513.html; printed on Jul. 14, 2005.

"Escrow.com Protects Online Buyers and Sellers from Fraud"; bearing a date of 1999-2005; pp. 1; Escrow.com; located at: https://www.escrow.com/index.asp; printed on Jul. 13, 2005.

"'Game theft' led to fatal attack"; pp. 1-2; located at http://news.bbc.co.uk/2/hi/technology/4397159.stm; BBC News; bearing a date of Mar. 31, 2005; printed on Apr. 11, 2005.

"Gaming Open Market—The next generation of game commodity trading. Frequently asked questions"; pp. 1-4; located at http://www.gamingopenmarket.com/faq.php; printed on Jul. 13, 2005.

Gentile, Gary; "Advertisers seek piece of video-game action"; Seattle Post-Intelligencer; May 21, 2005; pp. A1 and A11.

Gentile, Gary; "Products Places Liberally in Video Games"; May 23, 2005; pp. 1-3; abcNews; located at http://abcnews.go.com/Business/print?id=778965; printed on Jun. 17, 2005.

Graham-Rowe, Duncan; "Gamers turn cities into a battleground"; NewScientist.com; Jun. 12, 2005; pp. 1-3; located at: http://www.newscientist.com/article.ns?id=dn7498; printed on Jun. 17, 2005.

Haines, Lester; "Spurned woman deletes ex's gaming data"; pp. 1-2; located at http://www.theregister.co.uk/2005/01/21/spurned_womans_revenge/; The Register; bearing a date of Jan. 21, 2005; printed on Apr. 14, 2005.

Harrow, Jeffrey R.; "Future Brief, A Publication of New Global Initiatives, Inc."; bearing a date of 2004; pp. 1-5; located at http://www.futurebrief.com/Harrow-12.pdf; printed on Jul. 13, 2005.

Hershman, Tania; "Advertisers: Game On"; pp. 1; located at http://www.technologyreview.com/articles/05/05/issue/forward_advertisers.asp?p=1; TechnologyReview.com; bearing a date of May 2005; printed on Apr. 14, 2005.

Hilts, Peter; "Boys are from Neopets, Girls are from Barbie.com" Computer Bits; Jun. 2003, pp. 1-4; vol. 13 No. 6; located at http://info.neopets.com/computerbits.html; printed on May 17, 2005.

"IGE Frequently Asked Questions"; IGE; pp. 1-12; located at http://www.ige.com/FrequentyAskedQuestions.aspx; printed on Jan. 27, 2005.

Knight, Will; "Smart shoes decide on television time"; May 18, 2005; pp. 1-2; located at http://newscientist.com/article.ns?id=dn7395&print=true; NewScientist.com; printed on Jun. 17, 2005.

Kushner, David; "Engineering Everquest Online Gaming Demands Heavyweight Data Centers"; IEEE Spectrum; Jul. 2005; pp. 34-39; Institute of Electrical and Electronics Engineers, Inc.; New York, NY.

Kushner, David; "Engineering Everquest Online gaming demands heavyweight data centers"; IEEE Spectrum Online; Jul. 11, 2005; pp. 1-7; bearing a date of Jun. 30, 2005; located at http://www.spectrum.ieee.org/WEBONLY/publicfeature/jul05/0705eq.html; printed on Jul. 11, 2005.

"Monopoly Tycoon"; Atari Australia & New Zealand; pp. 1; located at http://www.atari.com.au/games/info.do?id=191; Atari Australia Pty Ltd.; printed on Mar. 1, 2005.

"New World Notes: Business Model Prototype"; Jun. 2, 2005; pp. 1-3; located at http://secondlife.blogs.com/nwn/2005/06/business_model_.html#more; printed on Jun. 8, 2005.

"Our Business"; IGE; bearing a date of 2001-2004; pp. 1-2; located at http://www.ige.com/corporate.aspx?lang=en; printed on Jan. 27, 2005.

"Penn State Behrend Establishes Credit Card Research Center"; Penn State Erie: The Behrend College; bearing dates of Nov. 22, 2004 and Sep. 27, 2004; pp. 1-2; located at http://www.pserie.psu.edu/newscal/news2004/november-creditcenter.htm; printed on Dec. 8, 2004.

Sandhana, Lakshmi; "Pacman comes to life virtually"; pp. 1-3; BBC News; bearing a date of Jun. 6, 2005; located at http://news.bbc.co.uk/1/hi/technology/4607449.stm; printed on Jun. 17, 2005.

"Second Life: Your World. Your Imagination."; bearing a date of 2005; pp. 1; Linden Research, Inc.; located at http://secondlife.com/; printed on Jun. 8, 2005.

"Spending Challenge"; The Mint: It Makes Cents; bearing a date of 2002; pp. 1-3; Northwestern Mutual; located at http://www.themint.org/tryit/spendingchallenge.php; printed on Jan. 26, 2005.

Terdiman, Daniel; "Sony Gets Real on Virtual Goods"; Wired News; bearing a date of Apr. 20, 2005; pp. 1-3; Lycos Inc.; located at http://wired.com/news/print/0,1294,67280,00.html; printed on Apr. 21, 2005.

Terdiman, Daniel; "Virtual Trade Tough Nut to Crack"; Wired News; bearing a date of Dec. 20, 2004; pp. 1-3; Lycos Inc.; located at http://wired.com/news/print/0,1294,66074,00.html; printed on Jan. 27, 2005.

"The Entertainment of the Future is already here"; Project Entropia; bearing a date of Jan. 27, 2005; pp. 1; located at http://www.project-entropia.com/Index.ajp; printed on Jan. 27, 2005.

Thompson, Clive; "Game Theories"; The Walrus Magazine; pp. 1-21; bearing a date of 2004; located at http://www.walrusmagazine.com/article.pl?sid=04/05/06/1929205&mode=nested&tid=1; printed on Jun. 17, 2005.

"TradEnable (I-escrow): Online Payment Service"; bearing a date of 2004; pp. 1-3; Stylusinc.om; located at http://stylusinc.com/WebEnable/Sales/tradenable.php; printed on Jul. 13, 2005.

Walker, Frank; "Coming soon: a PC combat game that shoots back"; The Sydney Morning Herald; bearing a date of Apr. 3, 2005; pp. 1-2; located at http://www.smh.com.au/news/World/Coming-soon-a-PC-combat-game-that-shoots-back/2005/04/02/1112302293552.html?oneclick=true; printed on Apr. 11, 2005.

Ward, Mark; "Life lessons in virtual adultery"; BBC News; bearing a date of Apr. 11, 2005; pp. 1-2; located at http://news.bbc.co.uk/2/hi/technology/4432019.stm; printed on Apr. 14, 2005.

U.S. Appl. No. 11/654,398, Jung et al.
U.S. Appl. No. 11/653,092, Jung et al.
U.S. Appl. No. 11/652,379, Jung et al.
U.S. Appl. No. 11/642,991, Jung et al.
U.S. Appl. No. 11/607,794, Jung et al.
U.S. Appl. No. 11/605,939, Jung et al.
U.S. Appl. No. 11/601,599, Jung et al.
U.S. Appl. No. 11/600,602, Jung et al.
U.S. Appl. No. 11/599,631, Jung et al.
U.S. Appl. No. 11/589,318, Jung et al.
U.S. Appl. No. 11/582,837, Jung et al.
U.S. Appl. No. 11/540,911, Jung et al.
U.S. Appl. No. 11/364,895, Jung et al.
U.S. Appl. No. 11/364,498, Jung et al.
U.S. Appl. No. 11/342,368, Jung et al.
U.S. Appl. No. 11/340,832, Jung et al.
U.S. Appl. No. 11/314,967, Jung et al.
U.S. Appl. No. 11/305,878, Jung et al.
U.S. Appl. No. 11/283,551, Jung et al.
U.S. Appl. No. 11/274,759, Jung et al.
U.S. Appl. No. 11/264,824, Jung et al.
U.S. Appl. No. 11/256,695, Jung et al.
U.S. Appl. No. 11/251,624, Jung et al.
U.S. Appl. No. 11/242,647, Jung et al.
U.S. Appl. No. 11/242,619 Jung et al.
U.S. Appl. No. 11/238,684, Jung et al.
U.S. Appl. No. 11/236,875, Jung et al.
U.S. Appl. No. 11/234,878, Jung et al.
U.S. Appl. No. 11/234,867, Jung et al.
U.S. Appl. No. 11/234,848, Jung et al.
U.S. Appl. No. 11/234,847, Jung et al.
U.S. Appl. No. 11/228,043, Jung et al.
U.S. Appl. No. 11/213,442, Jung et al.
U.S. Appl. No. 11/203,686, Jung et al.
U.S. Appl. No. 11/202,964, Jung et al.
U.S. Appl. No. 11/192,342, Jung et al.
U.S. Appl. No. 11/192,320, Jung et al.
U.S. Appl. No. 11/191,248, Jung et al.
U.S. Appl. No. 11/191,233, Jung et al.
U.S. Appl. No. 11/185,524, Jung et al.
U.S. Appl. No. 11/185,446, Jung et al.
U.S. Appl. No. 11/184,567, Jung et al.
U.S. Appl. No. 11/184,564, Jung et al.
U.S. Appl. No. 11/107,381, Jung et al.
U.S. Appl. No. 11/107,380, Jung et al.
U.S. Appl. No. 11/096,212, Jung et al.
U.S. Appl. No. 11/069,906, Jung et al.
U.S. Appl. No. 11/069,894, Jung et al.
U.S. Appl. No. 11/068,736, Jung et al.
U.S. Appl. No. 12/005,047, Jung et al.
U.S. Appl. No. 12/004,110, Jung et al.
U.S. Appl. No. 11/982,393, Jung et al.
U.S. Appl. No. 11/981,635, Jung et al.
U.S. Appl. No. 11/980,315, Jung et al.
U.S. Appl. No. 11/975,723, Jung et al.
U.S. Appl. No. 11/975,367, Jung et al.
U.S. Appl. No. 11/974,515, Jung et al.
U.S. Appl. No. 11/974,174, Jung et al.
U.S. Appl. No. 11/906,777, Jung et al.
U.S. Appl. No. 11/827,376, Jung et al.

Baig, Edward C.; "Slip into a second skin with an online avatar"; USA Today; bearing a date of Nov. 11, 2003; pp. 1-3; located at http://-www.usatoday.com/tech/columnist/edwardbaig/2003-11-11-baig_x.htm; printed on Apr. 1, 2008.

Bartle, Richard A.; "Designing Virtual Worlds: Bibliography"; bearing a date of Jun. 17, 2003; pp. 1-36; located at http://www.mud.co.uk/dvw/bibliography.html; printed on Mar. 24, 2008.

Burgess et al.; "Controlling the Virtual World: Governance of On-Line Communities"; http://cse.stanford.edu; pp. 1-2; located at http://cse.stanford.edu/classes/cs201-projects-98-99/controlling-the-virtual-world/case/index.html; printed on Mar. 24, 2008.

Castronova, Edward; "Virtual Worlds: A First-Hand Account of Market and Society on the Cyberian Frontier"; bearing a date of Dec. 2001; pp. 1-40; No. 618; located at http://papers.ssrn.com/abstract=294828; CESifo; Munich, Germany.

PCT International Search Report; International App. No. PCT/US 06/47584; Mar. 20, 2008; pp. 1-2.

Rhode, Steve; "Avoid credit card balance transfers requiring new purchases", Gannett News Service; bearing a date of Jul. 18, 2003; pp. 1-3; ProQuest, LLC; printed on Feb. 11, 2008.

"Star Wars Galaxies: An Empire Divided"; Adventure Manual; bearing a date of 2002, 2003; total pp. 75; LucasFilm Entertainment Company Ltd.

"There, Inc. Delivers a Brave New Online World to Consumers; Company Unveils There 'Limited Access' and Teams With Industry Leaders Including ATI, HP, and iVillage to Provide Consumers with compelling 3D World; Nike and Levi's Provide Immersive Brand Experience to Members."; Goliath Business Knowledge on Demand; bearing a date of Oct. 27, 2003; pp. 1-7; PR Newswire; Menlo Park, CA; printed on Apr. 8, 2008.

Bloomfield, Robert; "Patenting Virtual World Commerce"; Metanomics—Business and Policy in the Metaverse; bearing a date of Jun. 21, 2008; printed on Jun. 25, 2008; pp. 1-2; located at http://www.metanomics.net/21-jun-2008/patenting-virtual-commerce.

Bloomfield, Robert; "Patenting Virtual World Commerce"; TerraNova; bearing a date of Jun. 21, 2008; printed on Jun. 25, 2008; pp. 1-5; located at http://terranova.blogs.com/terra_nova/2008/06/last-week-i-rec.html#more.

PCT International Search Report; International App. No. PCT/US06/27424; pp. 1-2; Jun. 16, 2008.

U.S. Appl. No. 12/221,446, Jung et al.
U.S. Appl. No. 12/221,459, Jung et al.
U.S. Appl. No. 12/221,447, Jung et al.
U.S. Appl. No. 12/221,254, Jung et al.
U.S. Appl. No. 12/220,675, Jung et al.

PCT International Search Report; International App. No. PCT/US06/27389; dated Jul. 21, 2008; pp. 1-2.

PCT International Search Report; International App. No. PCT/US06/44770; dated Oct. 19, 2007; pp. 1-2.

U.S. Appl. No. 12/286,532, Jung et al.
U.S. Appl. No. 12/286,530, Jung et al.
U.S. Appl. No. 12/286,127, Jung et al.
U.S. Appl. No. 12/286,096, Jung et al.
U.S. Appl. No. 12/231,298, Jung et al.

Biggs, Stuart; "Enter danger zone, Matrix-style Governments worry about the hazardous reality-blurring effects of online gaming"; South China Morning Post; bearing a date of Aug. 30, 2005; pp. 1-2; © 2005 South China Morning Post Publishers Ltd.

Krotoski, Aleks; "Online: Virtual trade gets real: Buying virtual goods on the internet is one thing; killing for it is quite another"; The Guardian; bearing a date of Jun. 16, 2005; pp. 1-5; ProQuest; London (UK); printed on Nov. 10, 2009.

Kushner, David; "My Avatar, My Self"; Technology Review; bearing a date of Apr. 2004; pp. 50-55; vol. 107 No. 3; printed on Nov. 9, 2009.

Langberg, Mike; "Virtual World There Innovative to an Extent"; bearing a date of Nov. 27, 2003; San Jose Mercury News; p. 1G; printed on Nov. 9, 2009.

Stephens, Molly; "Sales of in-game assets: An illustration of the continuing failure of intellectual property law to protect digital creators"; Texas Law Review; bearing a date of May 2002; pp. 1513-1535; vol. 80, No. 6; printed on Nov. 6, 2009.
White, Mark; "War Of The Worlds"; Independent on Sunday; bearing a date of Jul. 31, 2005; pp. 1-4; Financial Times; © 2005 Independent Digital UK Ltd.
U.S. Appl. No. 12/291,349, Jung et al.
U.S. Appl. No. 12/291,336, Jung et al.
U.S. Appl. No. 12/291,160, Jung et al.
U.S. Appl. No. 12/291,020, Jung et al.
U.S. Appl. No. 12/290,679, Jung et al.
U.S. Appl. No. 12/290,674, Jung et al.
U.S. Appl. No. 12/290,653, Jung et al.
U.S. Appl. No. 12/290,458, Jung et al.
U.S. Appl. No. 12/290,358, Jung et al.
Bartle, Richard A.; "Pitfalls of Virtual Property"; Themis Group; bearing a date of Apr. 2004; pp. 1-22.
Grimmelmann, James; "Virtual Worlds As Comparative Law"; New York Law School Law Review; bearing a date of Dec. 8, 2004; pp. 147-184; vol. 49.
U.S. Appl. No. 12/658,618, Jung et al.
U.S. Appl. No. 12/658,613, Jung et al.
U.S. Appl. No. 12/658,609, Jung et al.
U.S. Appl. No. 12/658,600, Jung et al.
U.S. Appl. No. 12/661,997, Jung et al.
U.S. Appl. No. 12/661,996, Jung et al.
"MicroLoans take offbeat collateral"; The Wall Street Journal. Sunday Gazette—Mail; Bearing a date of Feb. 13, 2005; p. 5.D; Charleston, W.V.; printed on Apr. 19, 2010.
European Search Report; European App. No. EP 06 78 8839; Aug. 11, 2010 (received by our Agent on Aug. 12, 2010); pp. 1-6.

* cited by examiner

552 A computer-readable signal-bearing medium.

554 Program instructions operable to perform a process in a computer system, the process comprising:
  a) communicating with a virtual world and with a participant;
  c) providing an opportunity for the participant to make an arrangement with a protection entity that includes the protection entity providing a compensation upon a described loss being experienced in the virtual world in exchange for a consideration; and
  d) creating a record of the arrangement.

556 Communicating with a virtual world and with a participant includes communicating with a virtual world and with a participant via a network.

558 The process further comprising:
  e) communicating between the virtual world and the protection entity.

560 The process further comprising:
  e) providing a notification of an occurrence of the described loss.

562 The computer-readable signal-bearing medium includes a computer storage medium.

564 The computer-readable signal-bearing medium includes a communication medium.

782 A computer-readable signal-bearing medium.

784 Program instructions operable to perform a process in a computer system, the process comprising:
 a) sending an instruction to a virtual world related to a virtual character that represents a participant;
 b) enabling a participation by the virtual character in an arrangement with a risk distribution entity that includes the risk distribution entity providing a compensation to the virtual character upon a future occurrence of a described loss in the virtual world in exchange for a consideration transferred to the risk distribution entity;
 c) saving data representative of the arrangement.

786 The signal-bearing medium includes a computer storage medium.

788 The signal-bearing medium includes a communication medium.

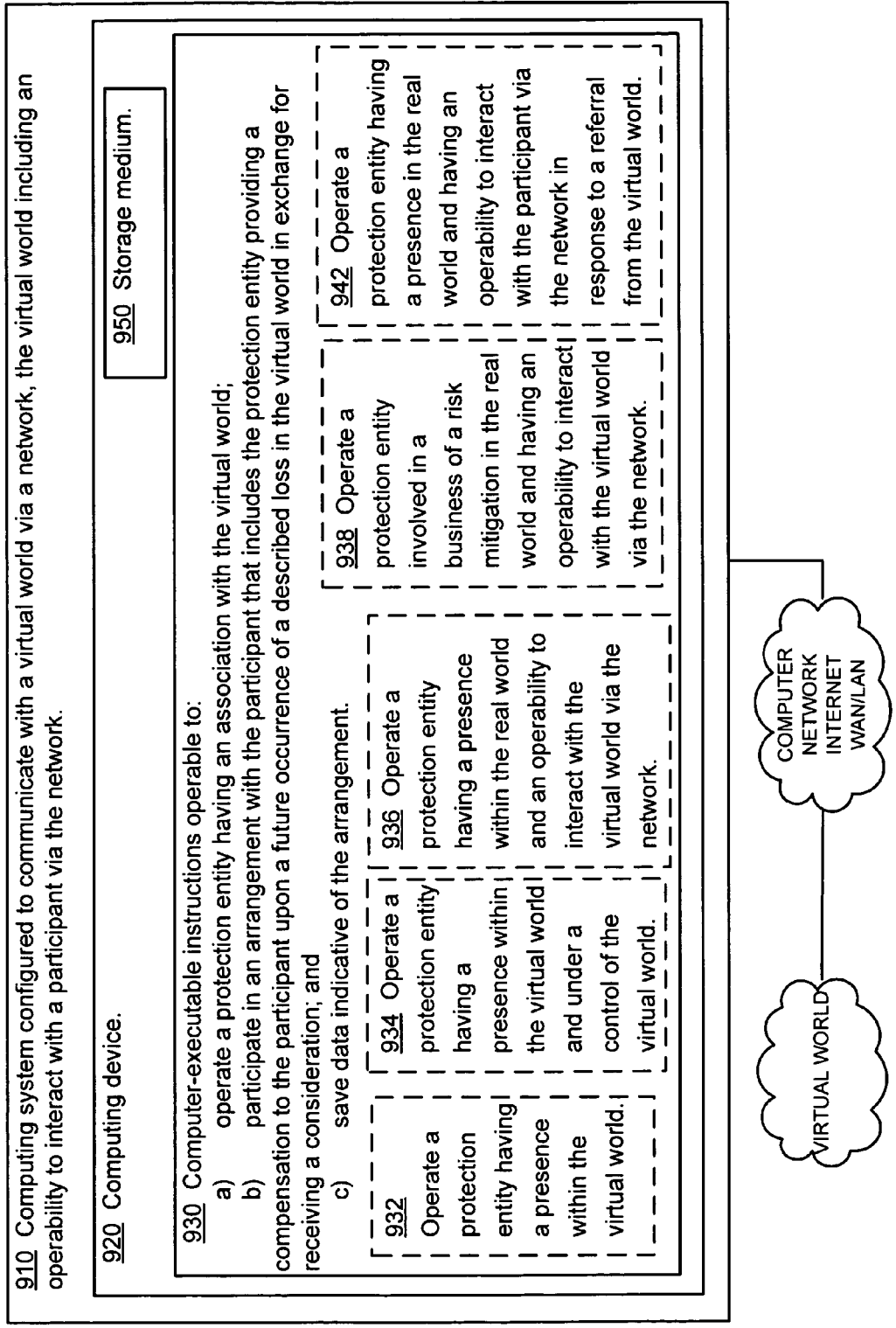

962 A computer-readable signal-bearing medium.

964 Program instructions operable to perform a process in a computer system, the process comprising:
 a) operate a protection entity having an association with the virtual world that includes an operability to interact with a participant via a network;
 b) participate in an arrangement with the participant that includes the protection entity providing a compensation to the participant upon a future occurrence of a described loss in the virtual world in exchange for receiving a consideration; and
 c) save data indicative of the arrangement 966 The signal-bearing medium includes a computer storage medium.

968 The signal-bearing medium includes a communication medium.

RISK MITIGATION IN A VIRTUAL WORLD

PRIORITY CLAIM, CROSS-REFERENCE TO RELATED APPLICATION, AND INCORPORATION BY REFERENCE

The present application is related to, claims the earliest available effective filing date(s) from (e.g., claims earliest available priority dates for other than provisional patent applications; claims benefits under 35 U.S.C. §119(e) for provisional patent applications), and incorporates by reference in its entirety all subject matter of the herein listed application(s); the present application also claims the earliest available effective filing date(s) from, and also incorporates by reference in its entirety all subject matter of any and all parent, grandparent, great-grandparent, etc. applications of the herein listed application(s). The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

For purposes of the USPTO extra-statutory requirements, the present application constitutes a continuation in part of U.S. patent application entitled VIRTUAL CREDIT IN SIMULATED ENVIRONMENTS, naming Edward K. Y. Jung, Royce A. Levien, Mark A. Malamud, and John D. Rinaldo, Jr. as inventors, filed Feb. 4, 2005, Ser. No. 11/051,514 now U.S. Pat. No. 7,958,047;

For purposes of the USPTO extra-statutory requirements, the present application constitutes a continuation in part of U.S. patent application entitled PAYMENT OPTIONS FOR VIRTUAL CREDIT, naming Edward K. Y. Jung, Royce A. Levien, Mark A. Malamud, and John D. Rinaldo, Jr. as inventors, filed Feb. 28, 2005, Ser. No. 11/069,905 now U.S. Pat. No. 7,774,275;

For purposes of the USPTO extra-statutory requirements, the present application constitutes a continuation in part of U.S. patent application entitled VIRTUAL CREDIT WITH TRANSFERABILITY, naming Edward K. Y. Jung, Royce A. Levien, Mark A. Malamud, and John D. Rinaldo, Jr. as inventors, filed Mar. 30, 2005, Ser. No. 11/096,265;

For purposes of the USPTO extra-statutory requirements, the present application constitutes a continuation in part of U.S. patent application entitled PARTICIPATING IN RISK MITIGATION IN A VIRTUAL WORLD, naming Edward K. Y. Jung, Royce A. Levien, Robert W. Lord, Mark A. Malamud, and John D. Rinaldo, Jr. as inventors, filed Jul. 27, 2005, Ser. No. 11/191,248.

For purposes of the USPTO extra-statutory requirements, the present application constitutes a continuation in part of U.S. patent application entitled PROVIDING RISK MITIGATION IN A VIRTUAL WORLD, naming Edward K. Y. Jung, Royce A. Levien, Robert W. Lord, Mark A. Malamud, and John D. Rinaldo, Jr. as inventors, filed Jul. 27, 2005, Ser. No. 11/191,233;

SUMMARY

An embodiment provides a system. The system includes a program comprising computer-readable instructions operable to manage a virtual world configured to interact with at least two participants over a network. The system also includes a risk mitigation module operable to facilitate an arrangement that includes a protection entity providing a benefit to a participant of the at least two participants (hereafter referred to as "the participant") upon an occurrence of a defined loss in the virtual world in exchange for a consideration. The system further includes a computer storage medium operable to save a record of the arrangement. In addition to the foregoing, other system embodiments described in the claims, drawings, and text form a part of the present application.

Another embodiment by way of non-limiting example includes a method. The method includes operating a virtual world in communication with a plurality of players over a network. The method also includes enabling a player of the plurality of players (hereafter referred to as "the player") and a risk distribution entity to form an agreement whereby a thing of value is conveyed to the risk distribution entity and the risk distribution entity undertakes to provide a benefit upon the player experiencing a specified loss in the virtual world. The method further includes making a digital record of the arrangement. In addition to the foregoing, other method embodiments described in the claims, drawings, and text form a part of the present application.

A further embodiment includes a computer program product. The computer-program product includes program instructions operable to perform a process in a computer system. The process includes communicating with a virtual world and with a participant. The process also includes providing an opportunity for the participant to make an arrangement with a protection entity that includes the protection entity providing a compensation upon a described loss being experienced in the virtual world in exchange for a consideration. The process further includes creating a record of the arrangement. The product further includes a computer-readable signal-bearing medium bearing the program instructions. In addition to the foregoing, other computer-program product embodiments described in the claims, drawings, and text form a part of the present application.

An embodiment provides a system. The system includes a computer-simulated environment wherein a participant is able to take part. The system also includes a risk management element of the computer-simulated environment that facilitates an arrangement that includes a protection entity providing a future benefit to the participant upon an occurrence of a defined loss in the computer-simulated environment in exchange for a transfer of a thing of value to the protection entity. The system further includes a computer storage medium operable to save a record of the arrangement. The system may include a participant interface communication link that enables the participant to access to the computer-simulated environment and participate in the risk management element. In addition to the foregoing, other computer-program system embodiments described in the claims, drawings, and text form a part of the present application.

Another embodiment provides a system. The system includes a computing device couplable to a virtual world via a public network. The system also includes instructions that when executed on the computing device cause the computing device to activate a virtual character that represents a participant in the virtual world. Further, the instructions enable a participation by the virtual character in an arrangement with a protection entity that includes the protection entity providing a compensation to the virtual character upon a future occurrence of a described loss in the virtual world in exchange for a consideration transferred to the protection entity. Also, the instructions make a record of the arrangement. In addition to the foregoing, other system embodiments described in the claims, drawings, and text form a part of the present application.

A further embodiment provides a method. The method includes accepting an input operating a virtual character in a virtual world. The method also includes, participating in an arrangement with a protection entity that includes the protection entity providing a compensation to the virtual character upon a future occurrence of a described loss in the virtual world in exchange for a consideration transferred to the protection entity. The method further includes, saving data indicative of the arrangement in a computer-readable medium. In addition to the foregoing, other method embodiments described in the claims, drawings, and text form a part of the present application.

An embodiment provides a computer program product. The computer-program product includes program instructions operable to perform a process in a computing device and a computer-readable signal-bearing medium bearing the program instructions. The process includes sending an instruction to a virtual world related to a virtual character. The process also includes enabling a participation by the virtual character in an arrangement with a risk distribution entity that includes the risk distribution entity providing a compensation to the virtual character upon a future occurrence of a described loss in the virtual world in exchange for a consideration transferred to the risk distribution entity. The process further includes saving data representative of the arrangement.

Another embodiment provides a method. The method includes operating a protection entity associated with a virtual world configured to interact with a participant via a network. The method also includes participating in an arrangement with the participant that includes the protection entity providing a compensation to the participant upon a future occurrence of a described loss in the virtual world in exchange for receiving a consideration. The method includes saving a record of the arrangement. In addition to the foregoing, other method embodiments described in the claims, drawings, and text form a part of the present application.

A further embodiment provides system. The system includes a computing system that includes a computing device which is configured to communicate with a virtual world via a network. The virtual world including an operability to interact with a participant via the network. The system also includes instructions that when executed on the computing device cause the computing system to operate a protection entity having an association with the virtual world. The instructions also cause the computing system to participate in an arrangement with the participant that includes the protection entity providing a compensation to the participant upon a future occurrence of a described loss in the virtual world in exchange for receiving a consideration. The instructions further cause the computing system to save data indicative of the arrangement. In addition to the foregoing, other system embodiments described in the claims, drawings, and text form a part of the present application.

An embodiment provides a computer-program product. The computer-program product includes program instructions operable to perform a process in a computing device. The process includes operate a protection entity having an association with the virtual world that includes an operability to interact with a participant via a network. The process also includes participate in an arrangement with the participant that includes the protection entity providing a compensation to the participant upon a future occurrence of a described loss in the virtual world in exchange for receiving a consideration. The process further includes save data indicative of the arrangement. The computer-program product includes a computer-readable signal-bearing medium bearing the program instructions. In addition to the foregoing, other computer-program product embodiments described in the claims, drawings, and text form a part of the present application.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined by the claims, will become apparent by reference to the drawings and the following detailed description.

BRIEF DESCRIPTION OF THE DRAWINGS

FIG. 8 illustrates a partial view of an exemplary computer-program product;

FIG. 15 illustrates a partial view of an exemplary computer-program product;

FIG. 22 illustrates a partial view of an exemplary system;

FIG. 23 illustrates a partial view of an exemplary computer-program product.

DETAILED DESCRIPTION

In the following detailed description of exemplary embodiments, reference is made to the accompanying drawings, which form a part hereof. In the several figures, like referenced numerals identify like elements. The detailed description and the drawings illustrate exemplary embodiments. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Figure 1:
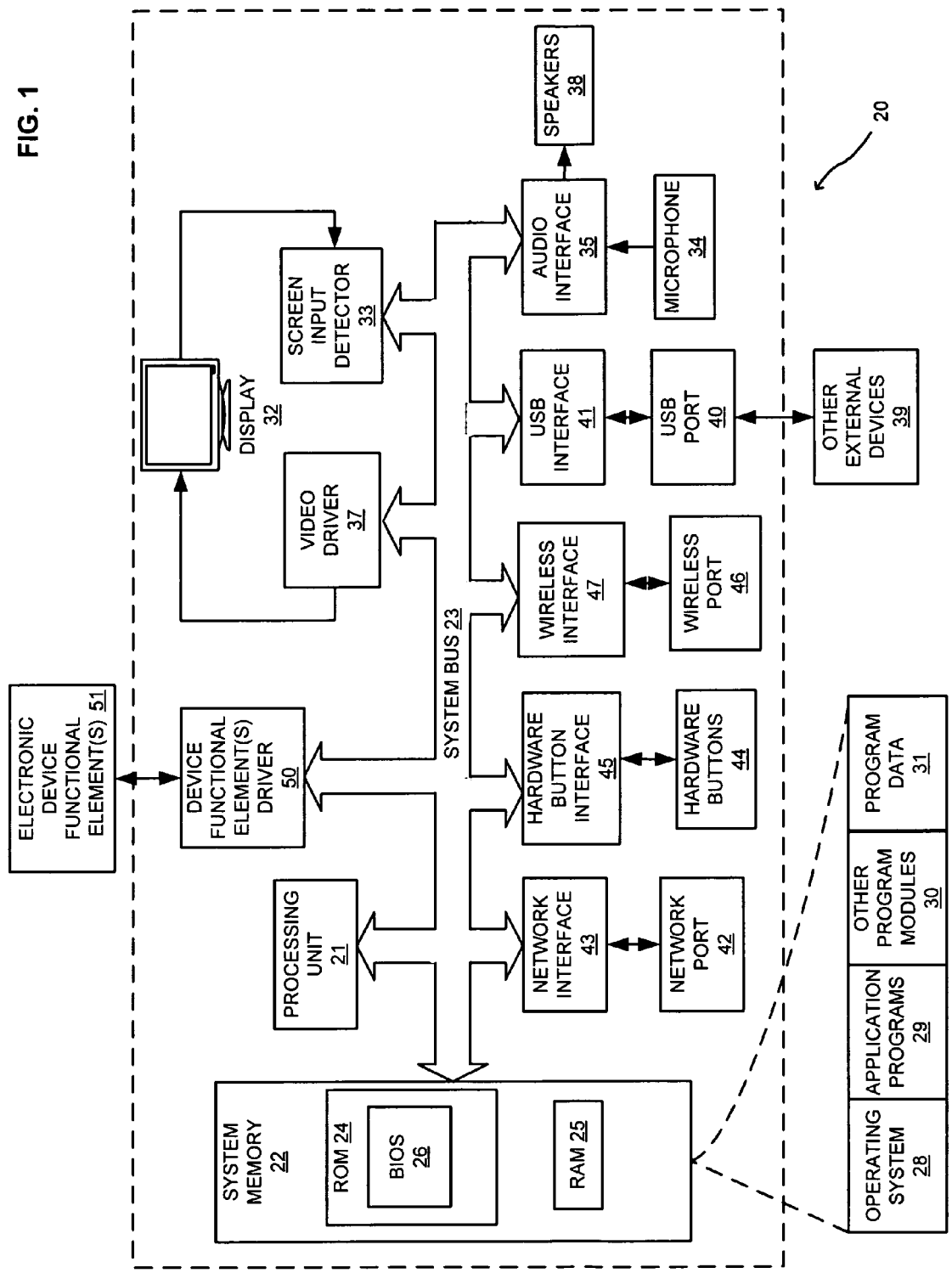
FIG. 1 illustrates an exemplary system in which embodiments may be implemented, including a thin computing device.
Figure 2:
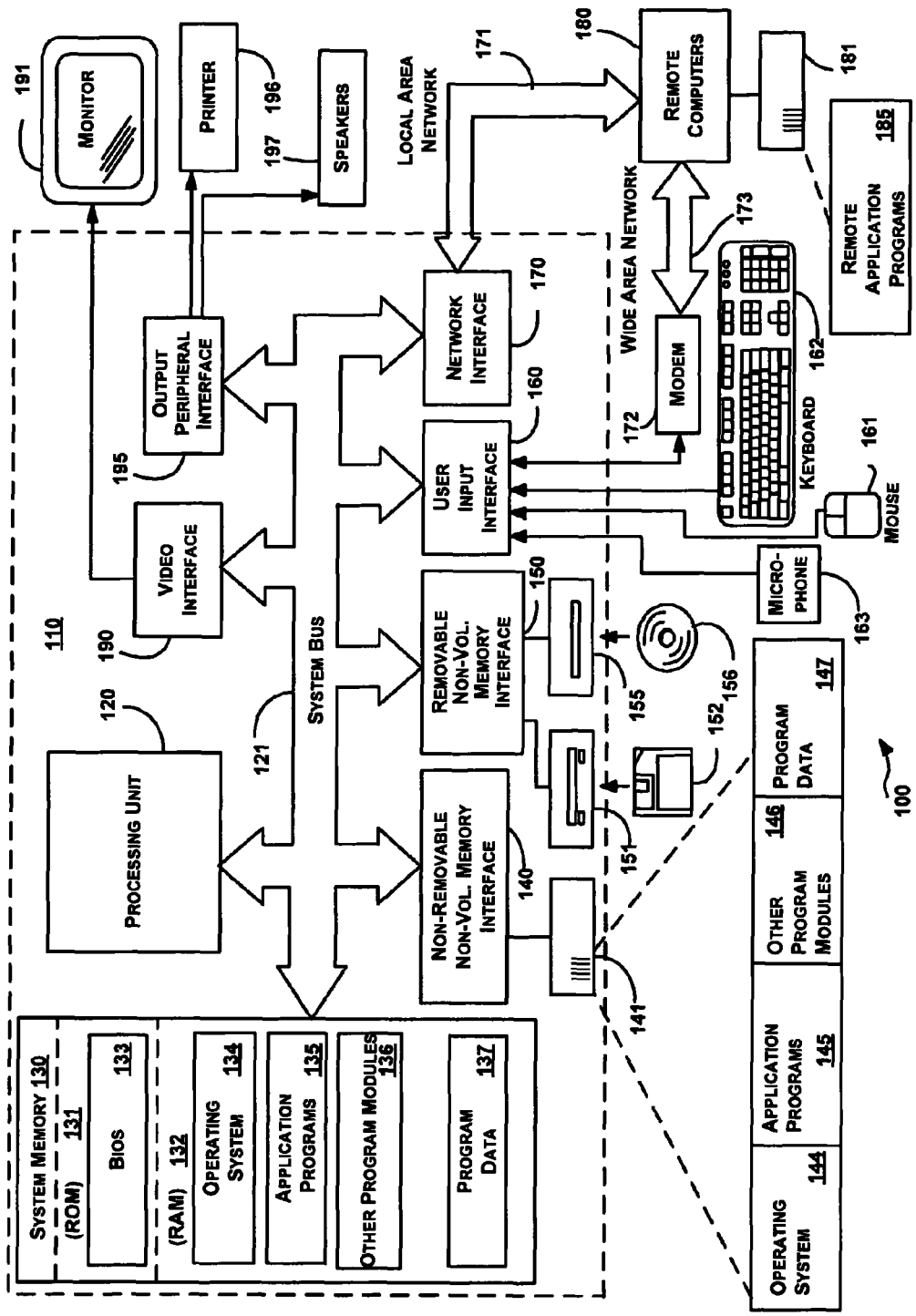
FIG. 2 illustrates another exemplary system in which embodiments may be implemented, including a general-purpose computing device.

FIGS. 1 and 2 are intended to provide a brief, general description of an illustrative and/or suitable exemplary environment in which embodiments may be implemented. An exemplary system may include a thin computing device 20 of FIG. 1 or the computing system environment 100 of FIG. 2. FIGS. 1 and 2 are examples of a suitable environment and are not intended to suggest any limitation as to the structure, scope of use, or functionality of an embodiment. A particular environment should not be interpreted as having any dependency or requirement relating to any one or combination of components illustrated in an exemplary operating environment. For example, in certain instances, elements of the environments may be deemed not necessary and omitted. In other instances, other elements may be deemed necessary and added.

FIG. 1 illustrates an exemplary system that includes a thin computing device 20 that interfaces with an electronic device (not shown) that includes one or more functional elements 51. For example, the electronic device may include any item having electrical and/or electronic components playing a role in a functionality of the item, such as a limited resource computing device, a game console, a digital camera, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30, and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and/or through wireless port 46 and corresponding wireless interface 47. Such a connection may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface having a character, key-based, other user data input via the touch sensitive display 32 using a stylus (not shown). Moreover, the user interface is not limited to an actual touch-sensitive panel arranged for directly receiving input, but may alternatively or in addition respond to another input device, such as the microphone 34. For example, spoken words may be received at the microphone 34 and recognized. Alternatively, the computing device 20 may be designed to include a user interface having a physical keyboard (not shown).

The device functional elements (not shown) are typically application specific and related to a function of the electronic device. The device functional elements are driven by a device functional element(s) interface 50, which coupled with the system bus 23. A functional element may typically perform a single well-defined task with little or no user configuration or setup, such as a refrigerator keeping food cold, a cell phone connecting with an appropriate tower and transceiving voice or data information, and a camera capturing and saving an image.

FIG. 2 illustrates another exemplary system in which embodiments may be implemented. FIG. 2 illustrates a general-purpose computing system, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes to non-removable, non-volatile magnetic media, a magnetic disk drive 151 that reads from and writes to a removable, non-volatile magnetic disk 152, and an optical disk drive 155 that reads from and writes to a removable, non-volatile optical disk 156 such as a CD ROM. Other removable/nonremovable, volatile/non-volatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The logical connections depicted in FIG. 2 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 2 illustrates remote application programs 185 as residing on computer storage medium 181. It will be appreciated that the network connections shown are exemplary and other means of establishing a communications link between the computers may be used.

In the description that follows, certain embodiments may be described with reference to acts and symbolic representations of operations that are performed by one or more computing devices, such as computing device 110 of FIG. 2. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 3:
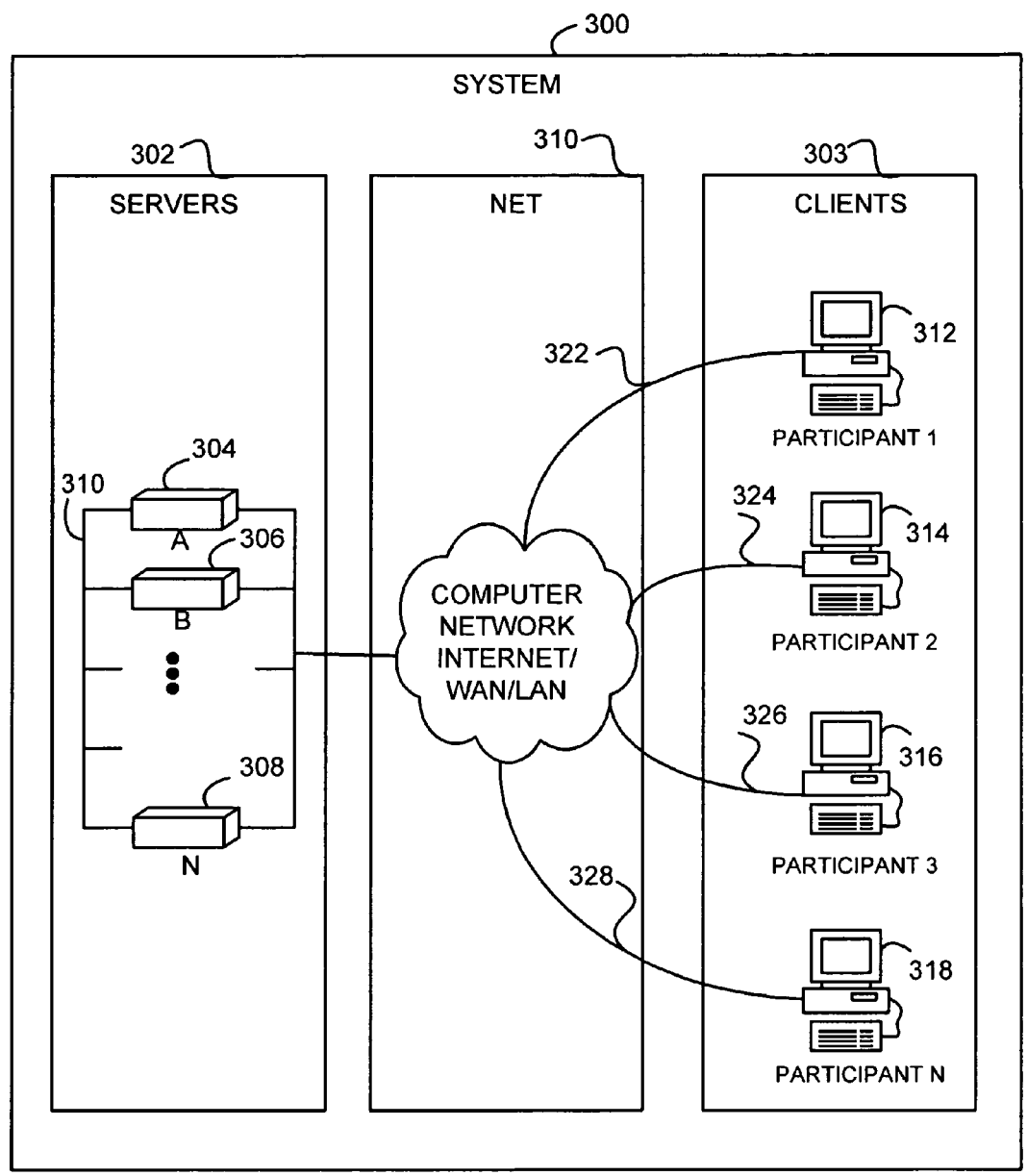
FIG. 3 illustrates a partial view of an exemplary system.

FIG. 3 illustrates a partial view of an exemplary system 300. The system 300 includes a server platform 302 and a client or participant platform 303. The server platform 302 may include a plurality of individual servers 304, 306, 308. The client platform 303 may include a plurality of individual clients 312, 314, 316, 318. The number of clients is limitless, constrained only by the physical characteristics of the server platform 302, client platform 303, and a communications network 310 connecting the two.

Each of the clients 312, 314, 316, 318 may include a personal computer running client software which facilitates a participant's activation, operation, and/or interaction with the virtual world. In other embodiments, the clients 312, 314, 316, 318 may include other computing devices, for example but not limited to, the thin computing devices such as the thin computing device 20 of FIG. 1, general-purpose computing systems such as the computing system 100 of FIG. 2, cellular telephones, wireless or palmtop computers, portable digital assistants, handheld game systems, and/or game consoles. Each client 312, 314, 316, 318 is generally responsible for displaying interacting objects (other participants, terrain, non-participant characters, etc.), displaying the virtual world's interface, processing a participant's inputs, playing music and sound, and performing other operations.

In an embodiment a computing system may include one or more computing devices operating in a coordinated and/or cooperative manner. In another embodiment, a computing system may include two or more computing systems operating in a coordinated and/or cooperative manner.

Each of the servers 304, 306, 308 generally includes a computer system having a server platform portion of the virtual world for communication, database storage, coordination, and overall control and administration of the virtual world. The servers 304, 306, 308 generally maintain state information and coordinate client interaction with various objects in a virtual environment, including but not limited to other clients, vehicles, artificial intelligence, terrain, music and sound. Each server 304, 306, 308 provides additional functions, such as security, recording virtual world goals and scoring and tracking each participant's advancement towards those goals.

The clients 312, 314, 316, 318 communicate with the server platform 302 via the communication network 310. In an embodiment, the communication network 310 may include the Internet. In other embodiments, the communication network 310 may include an intranet, a WAN, a LAN, and/or any other type of network utilizable for communicating between the server platform 302 and the client platform 303. For example, the communications network 310 could include, without limitation, a wireless network, a cellular network, or any other system that facilitates transmission of data. Each participant 312, 314, 316, 318 has an associated communications link (or session) with one or more of the servers 304, 306, 308. As shown in FIG. 3, participant 1 (312) could communicate with server A (304) via a communications link 322. Similarly, participant 2 (314) could communicate with server B (306) via communications link 324. The servers 304, 306, 308 are preferably interconnected via a communications network 310.

During operation of the system 300, a particular client, for example participant 1 (312), who desires to enter a virtual world, communicates through a communications link 322 with an allocated server A (304). The determination of which specific server 304, 306, 308 to which a particular participant is linked may depend on a number of parameters, such as server load, number of participants, location of clients, status of participant (e.g., position) within the virtual world itself, and other parameters. In the particular embodiment shown in FIG. 3, the number of servers 304, 306, 308 needed for allocation depends upon the number of participants. FIG. 3 illustrates operation of the system 300 when a number of participants 312, 314, 316, 318 are logged onto a plurality of servers 304, 306, 308.

When there are relatively few clients 303 participating in the virtual world, only one server may be needed to serve the clients 303. During virtual world operation, there may be no need for direct communication between participants. The server platform 302 communicates with each participant positional, status, and event data (referred to as participant or participant data, or as a participant's attributes) for other participants and for objects that the participant may see or interact with the virtual world. Such participant data may include, but is not limited to, avatar attributes, type, physics modeling, scoring, position, orientation, motion vector, animation, background music, participant music, inventory, vehicle, call sign, or other participant or object attributes necessary for the particular virtual world. Typically, the server includes a database of information that is maintained and updated as the participants interact within the virtual world. Through the interaction between the client platform 303 and the server platform 302, the virtual world is facilitated.

A virtual world may include a virtual reality environment. A virtual world may include a computer-simulated environment. A virtual world may be intended for virtual inhabitation and interaction, often using avatars. In an embodiment, a participant may include a human user, a spectator, an entity (human or otherwise based), and/or an entity that provides a service to a virtual world. Inhabitation may include a representation of its participants in a form of two or three-dimensional graphical representations of humanoids, or other graphical or text-based avatars. In an embodiment, such as illustrated in FIG. 3, a virtual world allows for multiple participants. In further embodiments, a virtual world may include a limited environment. For example, a limited environment may include a classroom, a city, an organization, and/or a special purpose space.

In certain embodiments, a virtual world may include at least one of the following characteristics:

1. Shared Space: a virtual world may allow many participants to participate at once.

2. Graphical User Interface: a virtual world may depict space visually, ranging in style from 2D "cartoon" imagery to more immersive 3D environments.

3. Simulation: a virtual world may include a simulation of the real world or a simulation of an imaginary world.

4. Virtual identity: a participant may participate in a virtual world through a virtual identity. A virtual identity may include one or more attributes and/or associations utilized by a virtual world in managing a participation in the virtual world. Further, a participant may interact with objects that are part of the virtual world through their virtual identity. These objects may be representations of items or other participants, such as avatars.

5. Immediacy: a virtual world may include interaction in real time.

6. Interactivity: a world may allow participants to alter, develop, build, or submit customized content. A virtual world may allow inter-participant communication.

7. Persistence: a virtual world's existence may continue regardless of whether individual participants are logged in. In an embodiment, a virtual world includes an online persistent world, active and available 24 hours a day and seven days a week. In another embodiment, a virtual world may persist for less than a whole day, or less than a whole week.

8. Socialization/Community: a virtual world may allow and encourage the formation of in-world social groups like guilds, clubs, cliques, housemates, neighborhoods, etc.

In certain embodiments, a virtual world may include a single player game. A virtual world may include a graphical reality as presently exists in multi-participant virtual worlds. In other embodiments, a virtual world may include communities and chat rooms. In further embodiments, a virtual world may include a training and/or classroom setting. A virtual world may be adapted for educational purposes. Educators may create an online community in which students log into and interact. Within an educational virtual world, students may use their avatar to learn about new assignments and to create projects that are viewable within the virtual world. For example, students taking a computer class may log into a virtual world in which they are the inhabitants of a village that needs their expertise. In other embodiments, a virtual world may be adapted for commerce, for professional, military, and vocational training, for medical consultation and psychotherapy, and even for social and economic experimentation.

In further embodiments, a virtual world may include a virtual monetary system that constitutes a medium of exchange that allows virtual world transactions. The monetary system may include virtual currency, monetary chips, discount coupons, award points, access rights, entrance keys, experience medals, level permits, bonus vouchers, skill merits, character traits, health benefits, success awards, entrance tickets, authorization passes, eligibility credentials, benefit tokens, vested rights, licenses, permissions, decryption codes, bonus vouchers, test certificates, game time credits, additional characters, control over other player characters, control over non-player characters, aliases, privacy levels, visibility levels, and disguises.

Figure 4:
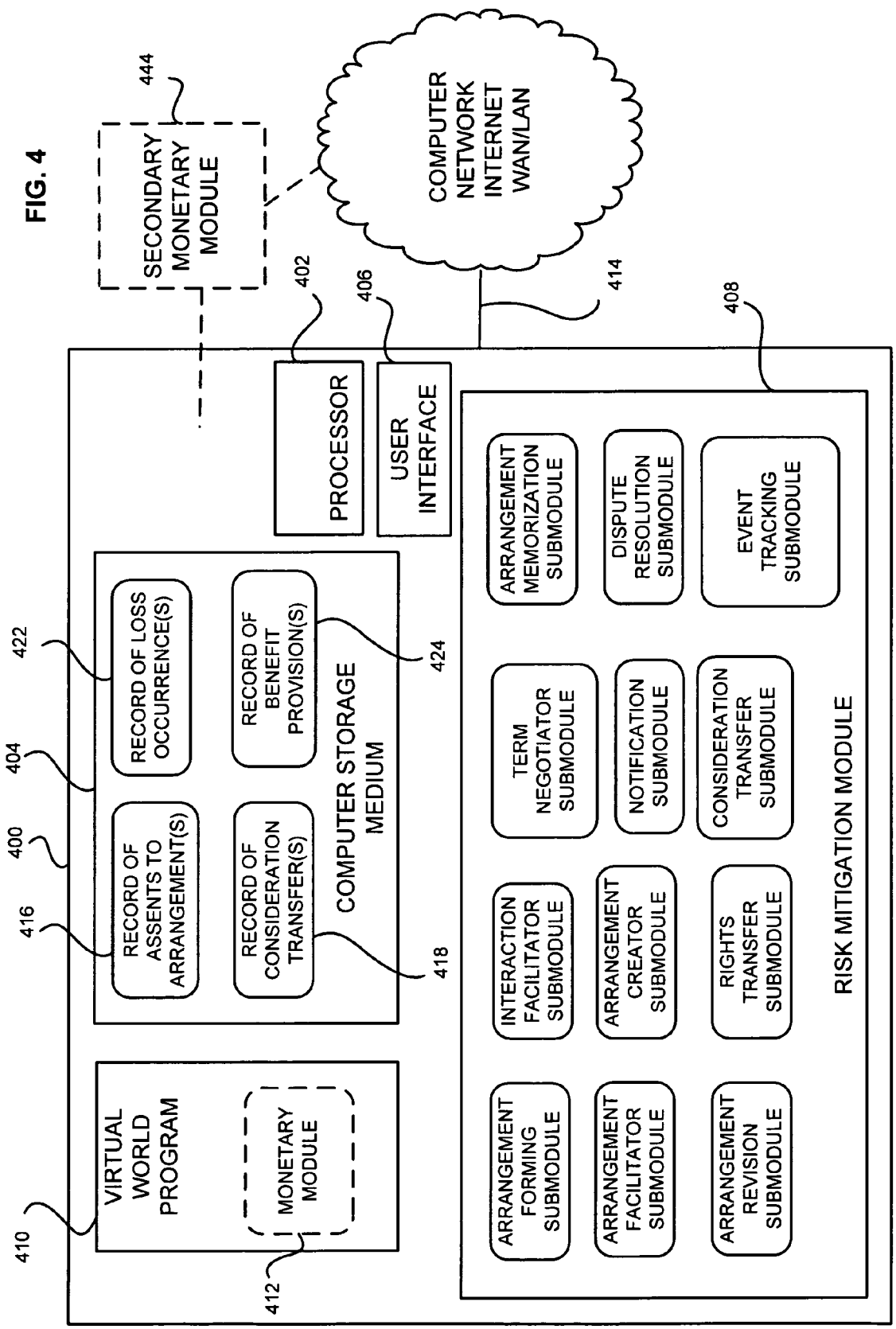
FIG. 4 illustrates an exemplary environment that includes a partial view of a system.

FIG. 4 illustrates an exemplary environment that includes a partial view of a system 400. The system may be incorporated in a server, for example, such as the server 304 of FIG. 3. The system includes a processor 402, computer storage medium 404, user interface 406, risk mitigation module 408, and virtual world program 410. In an embodiment, these elements may be at least substantially similar to corresponding elements of the thin computing device 20 of FIG. 1 and/or the computing system environment 100 of FIG. 2. A plurality of participants, such as the participants 1-4 associated with clients 312, 314, 316, 318 of FIG. 3, who may be at different locations, have bi-directional communication links 414 with the risk mitigation module via the user interface. The risk mitigation module may include one or more computer program products with a carrier medium having program instructions thereon. Such computer program products may run on multiple computer devices or run on an integrated computer system, depending on the circumstances.

The computer storage medium 404 provides a storage capability. Various categories of data stored in the computer storage medium 404 may include a record or data indicative of assents to arrangements 416, consideration transfers 418, loss occurrences 422, and benefit provisions 424. The system 400 enables at least two participants to respectively form an arrangement with a protection entity (not shown) that includes the protection entity providing a respective benefit to a participant upon an occurrence of a defined loss in the virtual world in exchange for a consideration.

In an embodiment, the system 400 includes a program 410 comprising computer-readable instructions operable to manage a virtual world configured to interact with at least two participants over a network. In an embodiment, the computer-readable instructions operable to manage a virtual world include computer-readable instructions operable to administer a virtual world. In another embodiment, the computer-readable instructions operable to manage a virtual world include computer-readable instructions operable to control a virtual world. In another embodiment, the computer-readable instructions operable to manage a virtual world include computer-readable instructions operable to provide a virtual world a virtual world experience to the at least two participants.

The system also includes a risk mitigation module, such as the risk mitigation module 408. The risk mitigation module includes operability to facilitate an arrangement that includes a protection entity (not shown) providing a benefit to a participant, such as the participant 1 (312) of FIG. 3 upon an occurrence of a defined loss in the virtual world in exchange for a consideration. The system also includes the computer storage medium, such as for example the computer storage medium 404, operable to save a record of the arrangement.

In an embodiment, the at least two participants may include at least two participants who control their respective virtual identity in the virtual world. The virtual identity may be embodied in an avatar. For example, a participant A would individually control their virtual identity A, which by way of further example may be an avatar representative of warrior. Participant B would individually control their virtual identity B, which by way of further example may be an avatar representative of a queen. The at least two participants who control their respective virtual identity in the virtual world include at least two participants who control their respective virtual identity having at least one attribute in the virtual world. The at least one attribute may include at least one of an attribute native to the virtual world, an attribute acquired from a source not native to the virtual world, an attribute created by another participant of the at least two participants, an attribute created by a third party, a weapon, a property, an asset, and or an item.

The network may include at least one of a private computer network or a public computer network. The network may include the Internet.

In another embodiment, the risk mitigation module operable to facilitate an arrangement may include a submodule operable to facilitate at least one of forming the arrangement, an interaction between the participant and the protection entity, creating the arrangement, negotiating a term of the arrangement, revising the arrangement, resolution of disputes, transferring the consideration, transferring a right of the participant in the arrangement, memorializing the arrangement, and notification regarding matters relevant to the arrangement.

In a further embodiment, the protection entity (not shown) may include a participant protection entity. The participant protection entity may include at least one of a real-world entity, a real-world entity engaged in a real-world business of entering into agreements similar to the arrangement, a person, an individual, a virtual-world entity, a virtual-world entity engaged in a business of entering into contracts similar to the arrangement, a fictional protection entity, or an avatar of the virtual world.

In an embodiment, the protection entity may include a non-participant protection entity. The non-participant protection entity may include at least one of a provider of the virtual world, an operator of the virtual world, a person associated with the virtual world, or a program associated with the virtual world program 410.

The providing a benefit to the participant may include providing a virtual-world benefit to the participant. The providing a benefit to the participant may include providing a real-world benefit to the participant. The providing a benefit to the participant may include providing a compensation to the participant. For example, the compensation may include payment in a form of a real world currency, and/or a virtual world currency. The providing a benefit to the participant may include providing an agreed-upon benefit to the participant. The providing a benefit to the participant may include providing a predetermined benefit to the participant. For example, a predetermined benefit for a loss of an avatar attribute, such as a life, an arm, or weapon, may include restoration of the life, arm, or weapon. In another example, a predetermined benefit may include extending a participant's subscription to a virtual world for a predetermined length of time. In a further example, a predetermined benefit may include a fixed amount of virtual-world compensation. The providing a benefit to the participant may include providing a compensation determined with relative to a circumstance existing at an occurrence of the loss. For example, a loss of life of an avatar having a high attained level in a virtual world may receive a greater benefit than a loss of an avatar life at a low attained level in the virtual world. In a further example, a loss of life of an avatar owning significant attributes and/or associations may receive a greater benefit than loss of a life of an avatar owning insignificant attributes and/or associations.

The providing a benefit to the participant may include providing a compensation that is a function of a participant attribute and/or environmental attribute measured at an occurrence of the loss. The providing a benefit to the participant may include providing an attribute replacement to the participant. The providing an attribute replacement to the participant may include providing at least one of a replacement of an attribute, a resurrection of a virtual identity of the participant in the virtual world, a replacement of a virtual-world property, a payment of a virtual-world fine, and a satisfaction of a virtual-world punishment.

In another embodiment, the defined loss may include a determinable contingency. The defined loss may include at least one of loss suffered by a participant occurring by reason of a harm, an injury, a death, a damaging, a casualty, a disability, and an imposed punitive obligation. The defined loss may include a loss relative to a subject matter of the arrangement in which the participant has an interest. The defined loss may include at least one of loss suffered by another participant having a relationship with the participant. For example, a loss suffered by another participant may include a loss suffered by another participant with whom the participant has a business relationship, a community relationship, and/or a familial relationship.

In an embodiment, a first participant may have an interest in a subject matter of the arrangement when a loss or damage to it would cause the first participant to suffer a financial loss or other kind of loss. For example, if a property owned by the first participant is damaged, the value of the property is reduced, and whether the first participant pays to have the property repaired or sells it at a reduced price, the first participant has suffered a financial loss resulting from the damage. By contrast, if a second participant's property is damaged, the first participant may be emotionally upset or disadvantaged, but the first participant would not directly suffer any loss by the damage. The first participant has an interest in their own property, but in this example the first participant does not have an insurable interest in the second participant's property.

In a further embodiment, the consideration may include a virtual-world consideration. The virtual-world consideration may include virtual-world money. The virtual-world consideration may include at least one of an attribute, a right, a body part, a weapon, or a token. The consideration may include a real-world consideration. The real-world consideration may include a real-world money. The consideration may include anything having a value. The consideration may include a consideration provided by the participant. The consideration may include a consideration provided by another participant of the at least two participants.

In an embodiment, the computer storage medium 404 operable to save a record of the arrangement may include a computer storage medium operable to save at least one of a record of a conveyance of the consideration 418 to the protection entity, a record of assents 416 to the arrangement, such as for example a record of the protection entity's assent to the arrangement, a record of an occurrence of the loss 422, or a record of any provision of the benefit 424. The computer storage medium operable to save a record of the arrangement may for example include the computer storage media described in conjunction with FIG. 2.

In an embodiment, the system 400 further includes a monetary module 412 operable to manage a medium of exchange in the virtual world expressed as a virtual-world currency unit. In an embodiment, the virtual world program 410 may include the monetary module. In another embodiment, the monetary module may not be included in the virtual world program. The virtual-world currency unit may include a virtual-world currency having a value in the virtual world and facilitating an exchange for goods and services. The virtual-world currency having a value in the virtual world and facilitating an exchange for goods and services may include a virtual-world currency having a value in the virtual world and usable as at least one of the consideration and the benefit.

In another embodiment, the system 400 further includes the monetary module 412 providing a native virtual-world medium of exchange expressed as a native virtual-world currency unit having a value in the virtual world. The system also includes a secondary monetary module 444 coupled with the virtual world. In an embodiment, the secondary monetary module may be an integral component of the system 400. In an alternative embodiment, the secondary monetary module may be coupled with the system, such as for example, it may be coupled by communication via a computer network. The secondary money module includes an operability to manage a secondary virtual-world medium of exchange expressed as a secondary virtual-world currency unit having a value in the virtual world and facilitating at least one of the benefit and the consideration. The monetary module coupled with the virtual world may include a monetary module coupled with the virtual world and subject to control of the virtual world. The monetary module coupled with the virtual world and subject to control of another participant of the at least two participants may include a monetary module coupled with the virtual world and subject to control of a participant protection entity. The secondary virtual world currency may include a secondary virtual world currency having a value in another virtual world.

Although a participant may be illustrated and/or described herein as a single illustrated figure, a participant may be representative of a human user, a robotic user (e.g., computational entity), and/or substantially any combination thereof (e.g., a participant may be assisted by one or more robotic agents). In addition, a participant, as set forth herein, although shown as a single entity may in fact be composed of two or more entities. Those skilled in the art will appreciate that, in general, the same may be said of "player," "protection entity," and/or other entity-oriented terms as such terms are used herein. Further, a participant may include an agent, a program agent, a proxy, and/or a representative of the participant.

The following includes a series of illustrations depicting implementations of processes. For ease of understanding, certain illustrations are organized such that initial illustrations present implementations from an overall "big picture" viewpoint, and following illustrations present alternate implementations and/or expansions of the "big picture" illustrations as either sub-steps or additional steps building on one or more earlier-presented illustrations.

Figure 5:
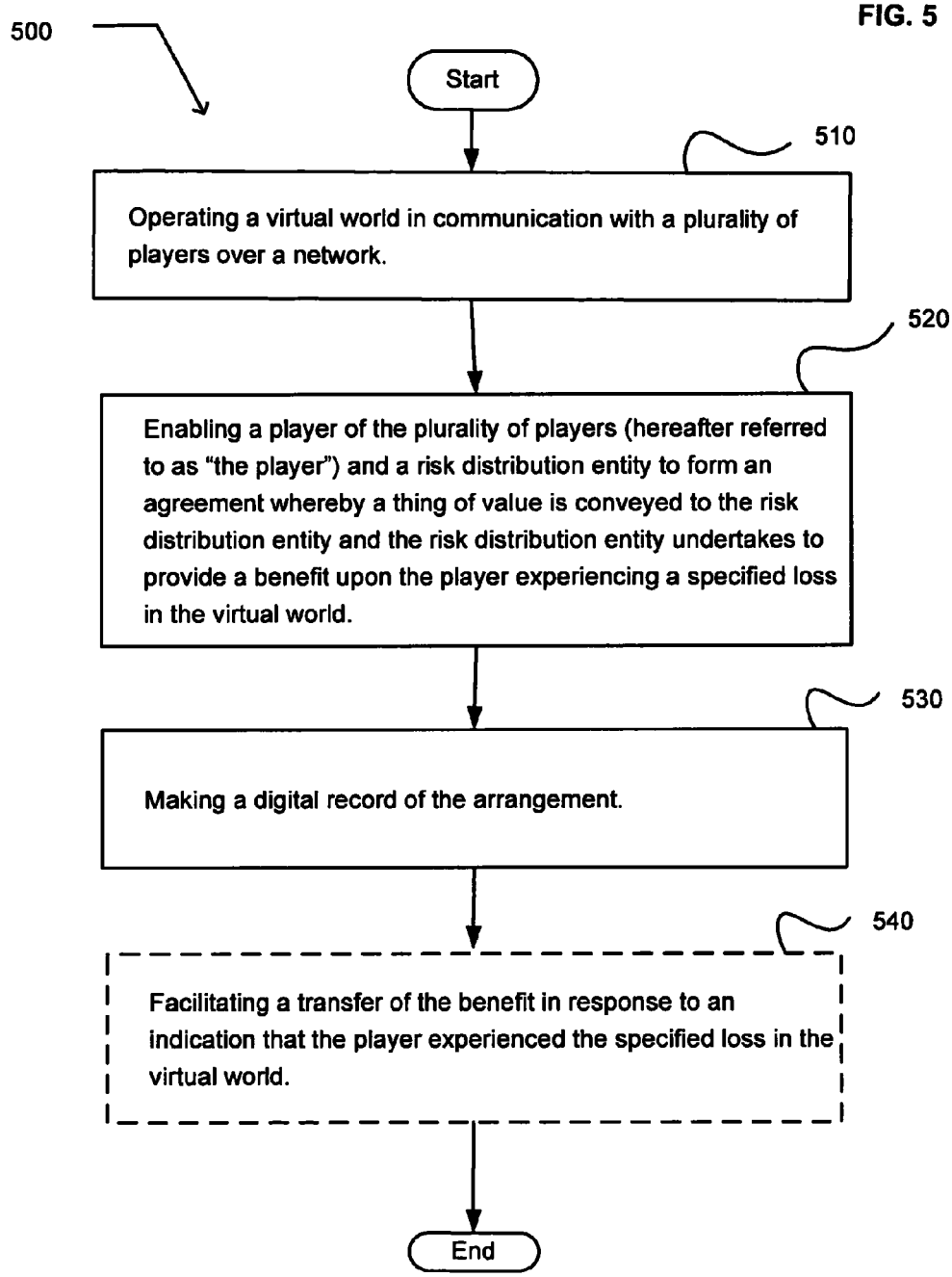
FIG. 5 illustrates an exemplary operational flow.

FIG. 5 illustrates an exemplary operational flow 500. After a start operation, the operational flow moves to a managing operation 510. The managing operation operates a virtual world in communication with a plurality of players over a network. A facilitation operation 520 enables a player of the plurality of players (hereafter referred to as "the player") and a risk distribution entity to form an agreement whereby a thing of value is conveyed to the risk distribution entity and the risk distribution entity undertakes to provide a benefit upon the player experiencing a specified loss in the virtual world.

In an embodiment, the thing of value may include virtual world thing of value, or a real world thing of value. The thing of value may be conveyed to the risk distribution entity by the player. The thing of value may be conveyed to the risk distribution entity by another player of the plurality of players. The risk distribution entity may undertake to provide a benefit to the player, or to another player of the plurality of players. The risk distribution entity may undertake to provide a benefit upon the player experiencing a specified loss in the virtual world, or upon to another player of the plurality of players experiencing a specified loss in the virtual world.

A documenting operation 530 makes a digital record of the arrangement. The digital record of the arrangement may include at least one of a digital record of a conveyance of a thing of value to the protection entity, the protection entity's assent to the arrangement, the player's assent to the arrangement, a provision of the benefit in the virtual world or in the real world, or an occurrence of the specified loss in the virtual world. The operational flow then moves to an end operation.

The operational flow 500 may include at least one additional operation, such as an assistance operation 540. The assistance operation facilitates a transfer of the benefit in response to an indication that the player experienced the specified loss in the virtual world.

Figure 6:
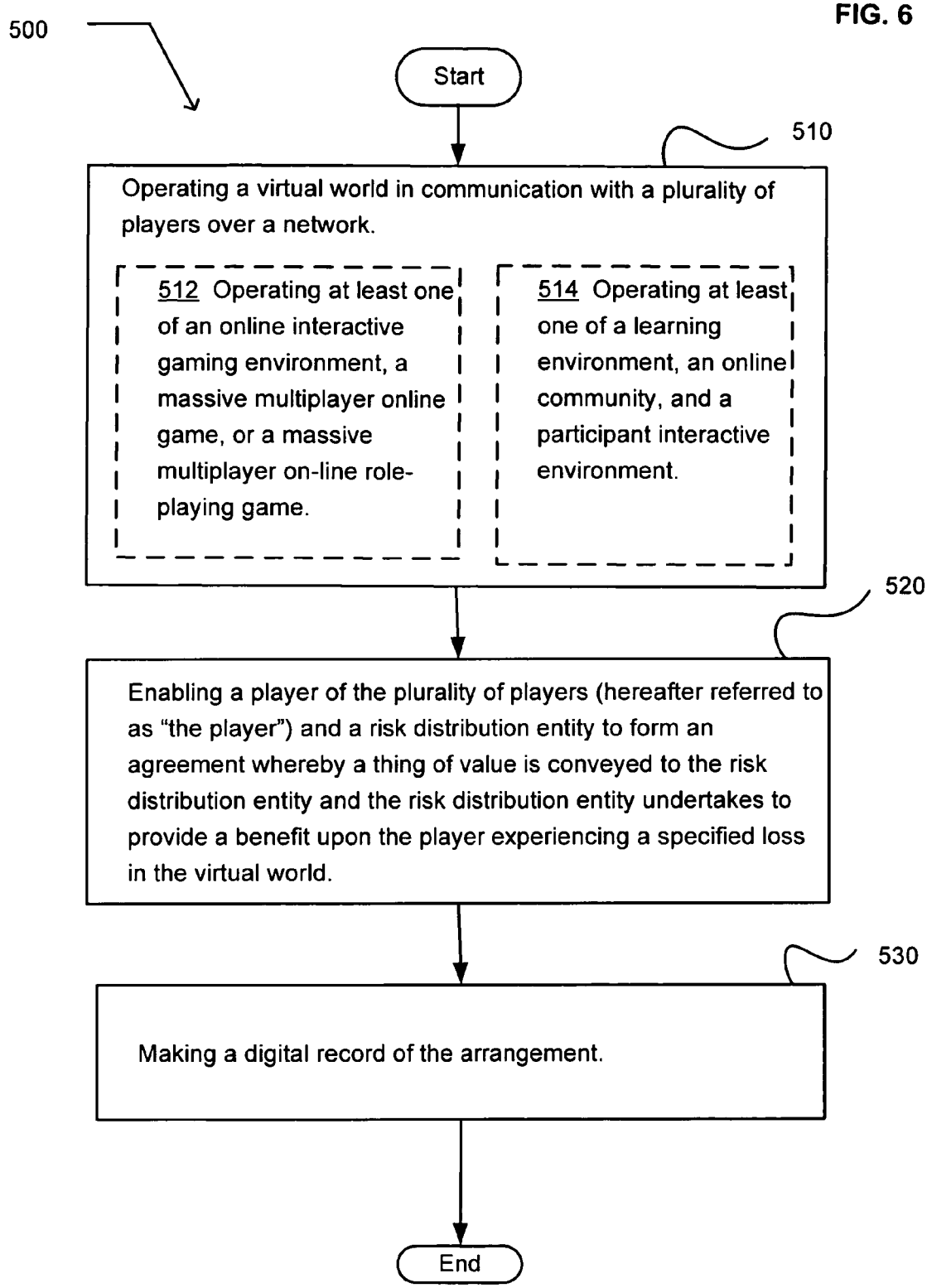
FIG. 6 illustrates an alternative embodiment of the exemplary operational flow of FIG. 5.

FIG. 6 illustrates an alternative embodiment of the exemplary operational flow 500 of FIG. 5. The managing operation 510 may include at least one additional operation. An additional operation may include an operation 512, and/or an operation 514. The operation 512 operates at least one of an online interactive gaming environment, a massive multiplayer online game, or a massive multiplayer on-line role-playing game. The operation 514 operates at least one of a learning environment, an online community, and/or a participant interactive environment.

Figure 7:
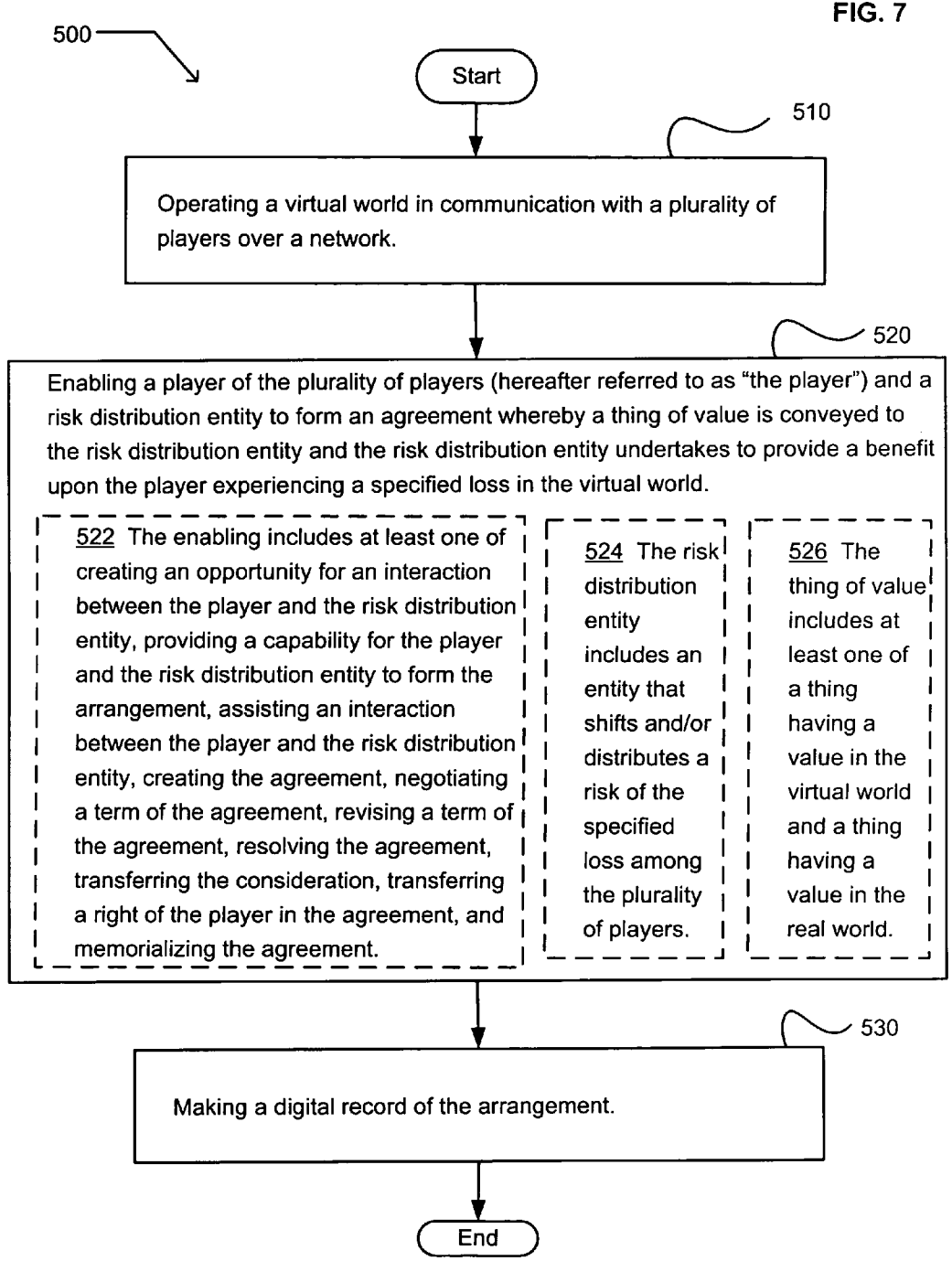
FIG. 7 illustrates another alternative embodiment of the exemplary operational flow of FIG. 5.

FIG. 7 illustrates an alternative embodiment of the exemplary operational flow 500 of FIG. 5. The facilitation operation 520 may include at least one additional operation. An additional operation may include an operation 522, an operation 524, and an operation 526. At the operation 522, the enabling a player and a risk distribution entity to form an agreement includes at least one of creating an opportunity for an interaction between the player and the risk distribution entity, providing a capability for the player and the risk distribution entity to form the arrangement, assisting an interaction between the player and the risk distribution entity, creating the agreement, negotiating a term of the agreement, revising a term of the agreement, resolving the agreement, transferring the consideration, transferring a right of the player in the agreement, and memorializing the agreement. At the operation 524, the risk distribution entity includes an entity that shifts and/or distributes a risk of the specified loss among the plurality of players. At the operation 526, the thing of value includes at least one of a thing having a value in the virtual world and a thing having a value in the real world.

FIG. 8 illustrates a partial view of an exemplary computer-program product 550. The computer-program product includes a computer program 554 for executing a computer process in a computing system. An embodiment of the exemplary computer-program product may be provided using a computer-readable signal-bearing medium 552, and includes computer executable instructions. The computer product encodes the computer program for executing a computer process. The computer process includes communicating with virtual world and a participant. The computer process also includes providing an opportunity for the participant to make an arrangement with a protection entity that includes the protection entity providing a compensation upon a described loss being experienced in the virtual world in exchange for a consideration. The process further includes creating a record of the arrangement.

In an alternative embodiment, the computer process 554 may further include an additional process, such as a process 556, a process 558, and/or a process 560. At the process 556, the communicating with a virtual world and with a participant may include communicating with a virtual world and with a participant via a network. At the process 558, the computer process may further include communicating between the virtual world and the protection entity. At the process 560, the computer process may further include providing a notification of an occurrence of the described loss.

In another embodiment, the computer-readable signal-bearing medium 552 may include a computer storage medium 562, which may be carried by a computer-readable carrier (not shown). The computer-readable signal-bearing medium 552 may include a communications medium 564. In an alternative embodiment, the computer program 554 may be implemented in hardware, software, and/or firmware, and/or a combination thereof.

Figure 9:
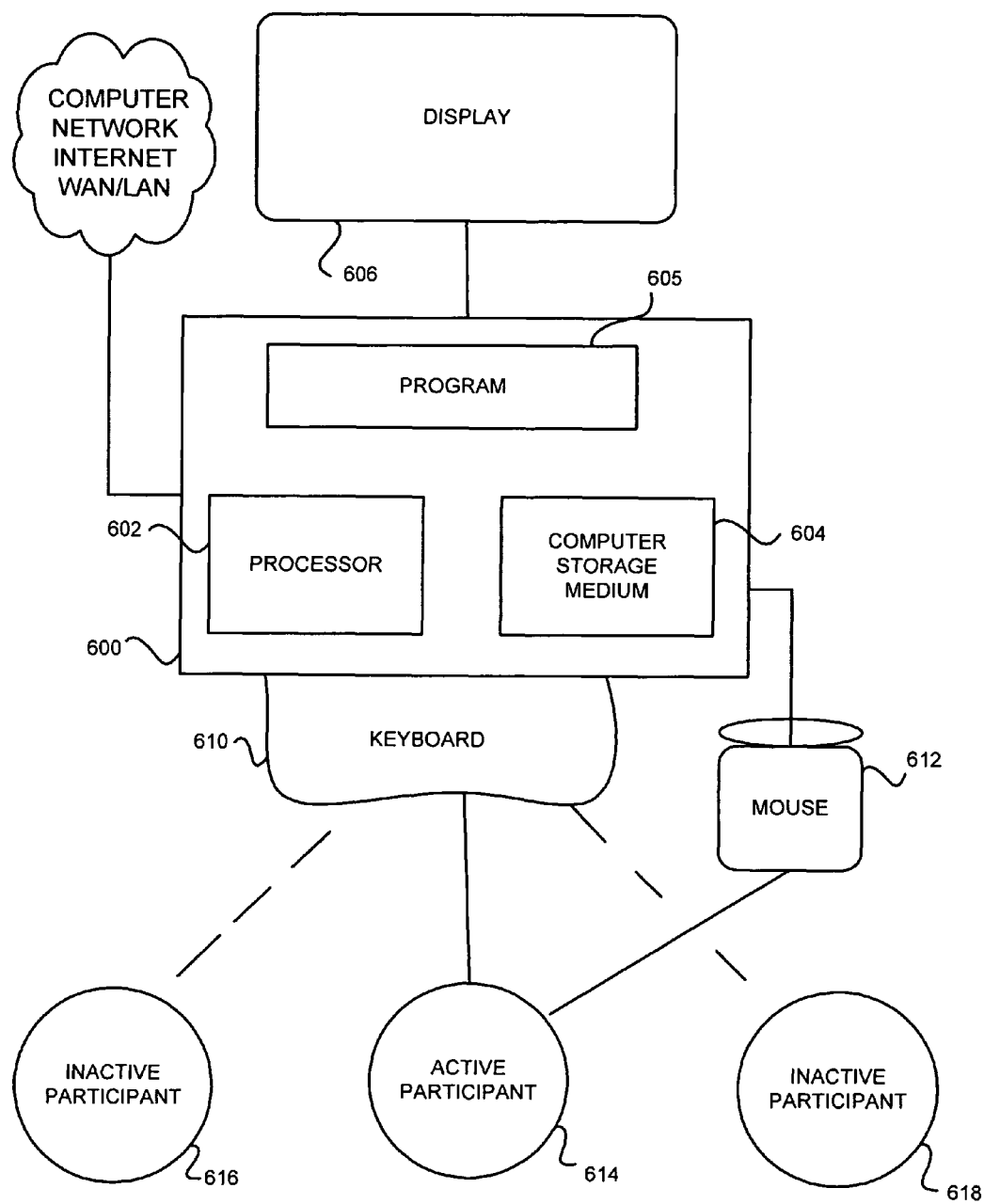
FIG. 9 illustrates a partial view of an exemplary environment in which embodiments may be implemented.

FIG. 9 illustrates a partial view of an exemplary environment in which embodiments may be implemented. FIG. 9 includes a computing device 600 having a processor 602 and computer storage medium 604 for saving a program 605. In an embodiment, the computing device may include elements at least substantially similar to the thin computing device 20 of FIG. 1 and/or the computing device 110 of FIG. 2. The program 605 may be incorporated in one or more computer program products having a carrier medium with program instructions thereon. Peripheral components may include display 606, as well as input devices such as keyboard 610 and mouse 612. An active participant 614 may have access to features disclosed in the exemplary operational flows described in conjunction with FIGS. 12-14 by running the program 605. Inactive participants 616, 618 may also periodically have access to the program 605 including non-real time interaction through the program with each other and/or with active participant 614 in order to participate in the benefits and advantages of the methods and processes disclosed herein.

Figure 10:
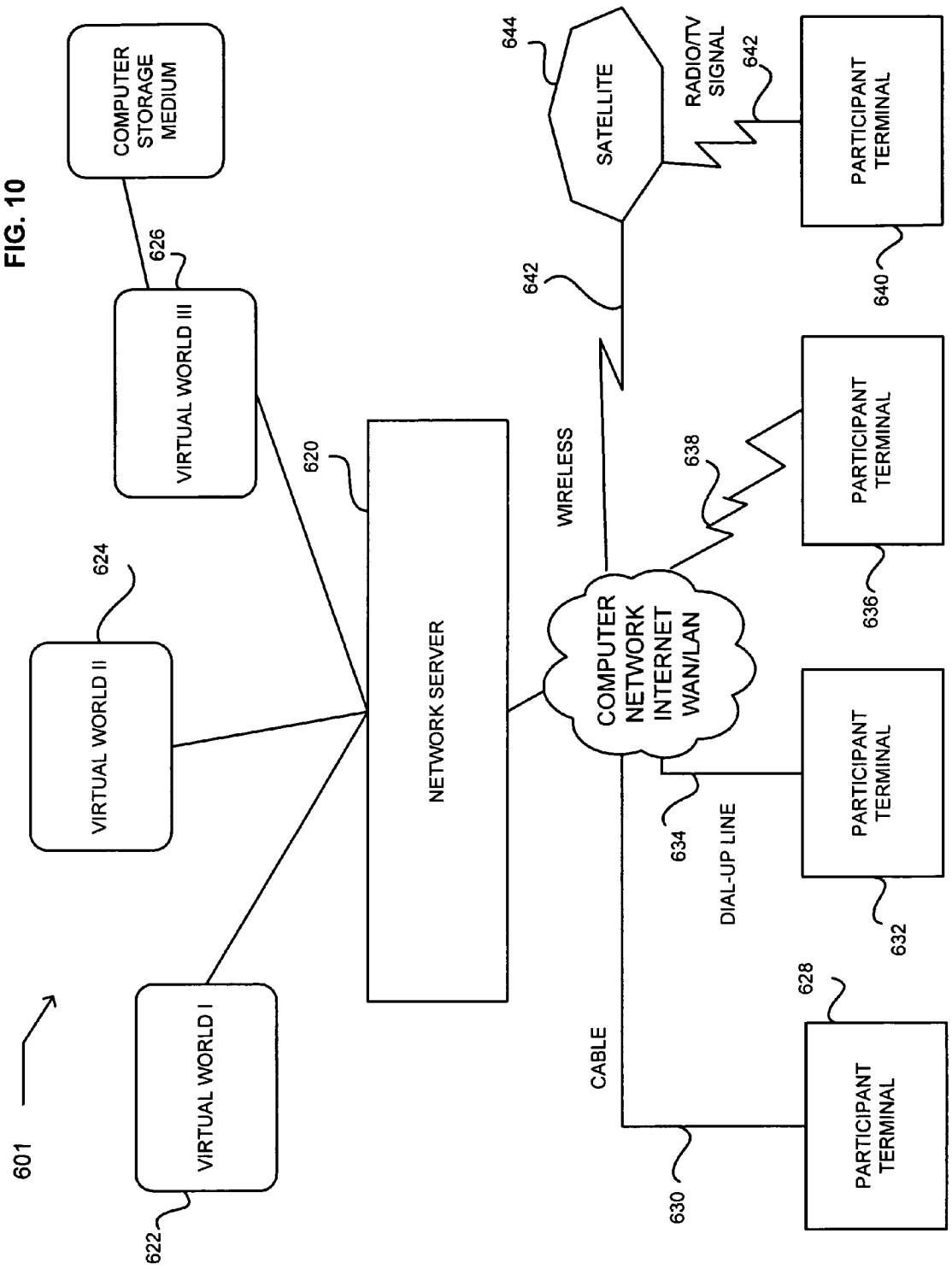
FIG. 10 illustrates a partial view of an environment in which embodiments may be implemented.

FIG. 10 illustrates a partial view of an environment 601 in which embodiments may be implemented. FIG. 10 includes a networked system having a network server 620 with communication links to different virtual world environments 622, 624, 626. In this exemplary version, terminal 628 has access through cable connection 630, terminal 632 has access through dial-up line 634, terminal 636 has access through wireless connection 638, and terminal 640 uses transmission signals 642 (e.g., radio or television signals) via satellite 644 for access to a network, illustrated as a computer network, the Internet, a WAN, and/or a LAN. The network server 620 is coupled with the network. Participants may be logged on to participate simultaneously in risk mitigation arrangements in virtual world environments, or be respectively logged on during non-overlapping or partially overlapping time periods. Such participation may be directly with other parties or indirectly through intermediaries, depending on the circumstances involved.

Figure 11:
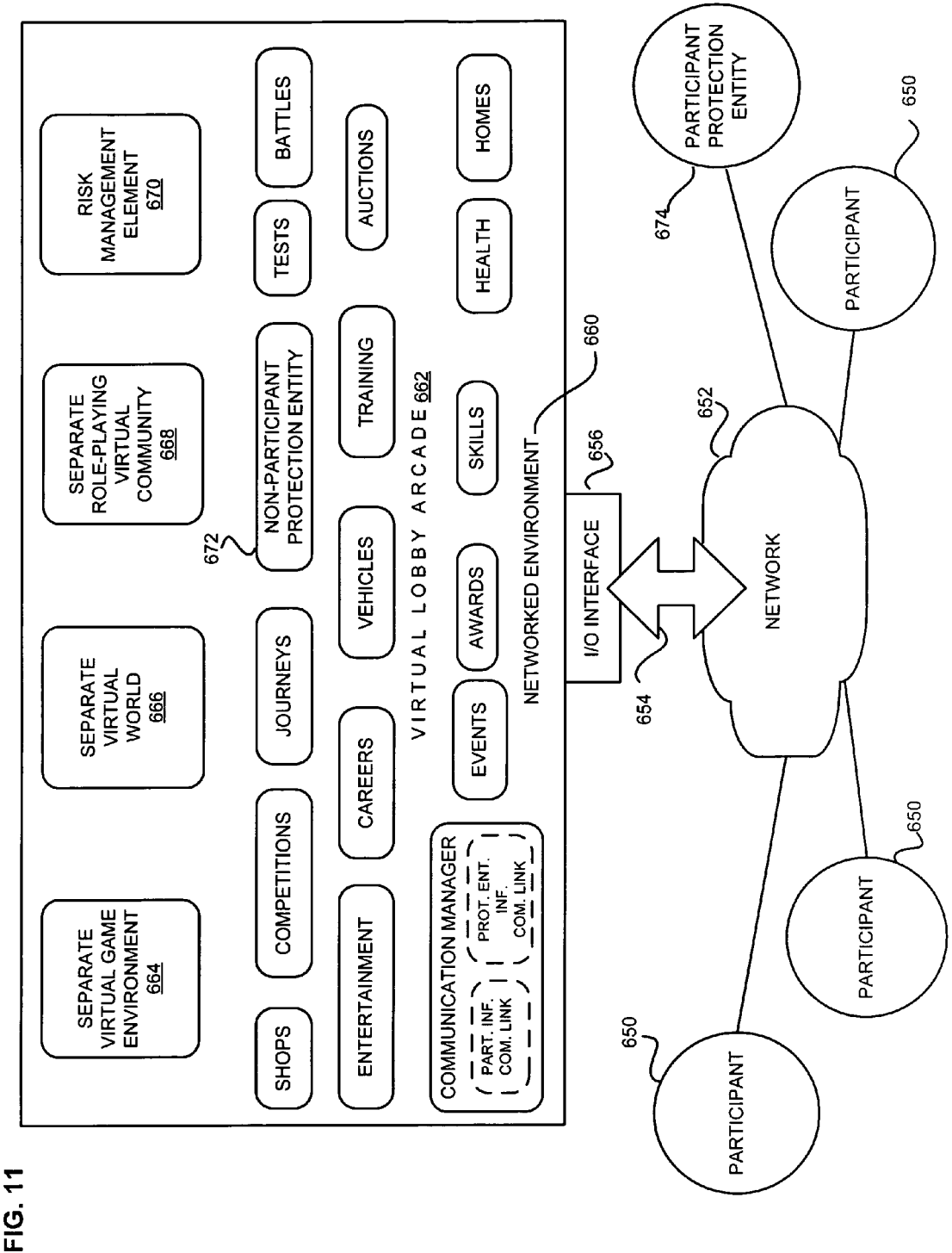
FIG. 11 illustrates a partial view of an exemplary networked environment.

FIG. 11 illustrates a partial view of an exemplary networked environment 660. The networked environment is interactive with players 650 via a network 652 having an interactive communication link 654 through I/O interface 656. Such a network 660 may include a virtual lobby arcade 662 with various types of virtual opportunities. The categories for such virtual opportunities are almost unlimited, and may for example include shops, competitions, journeys, test, battles, entertainment, careers, vehicles, training, auctions, communication manager, events, awards, skills, health, and homes. A non-participant protection entity 672 operating, for example, as a storefront business, interacts with participants to facilitate an arrangement with them to mitigate, manage, and/or distribute risk in a virtual world, for example, such as the game environment 664, the virtual world 666, and/or the role-playing virtual community 668. A risk management element 670 enables the non-participant protection entity.

In an alternative embodiment, the networked environment 600 may include a participant protection entity 674. The participant protection entity may be coupled with the networked environment via the network 656.

It will be understood that separately owned virtual environments may be included as part of the virtual network environment 660, including the virtual game environment 664, the virtual world 666, and/or the role-playing virtual community 668. The services of the non-participant protection entity 672 may also be usable in these separate individual virtual environments based on appropriate agreements with their owners and/or operators.

A system embodiment may be implemented employing the environments illustrated in FIGS. 9-11. The system includes a computer-simulated environment wherein a participant is able to take part. In an embodiment, the computer-simulated environment may include the virtual world I 622, the virtual world II 624, and/or the virtual world III 626 of FIG. 10. In another embodiment, the computer-simulated environment may include the virtual game environment 664, the virtual world 666, and/or the role-playing virtual community 668 of FIG. 11.

The system also includes a risk management element of the computer-simulated environment. In an embodiment, the risk management element may include the risk management element 670 of FIG. 11. The risk management element includes an operability that facilitates an arrangement that includes a protection entity providing a future benefit to the participant upon an occurrence of a defined loss in the computer-simulated environment in exchange for a transfer of a thing of value to the protection entity. In an embodiment, the future benefit may include at least one of a compensation, or an attribute replacement. In another embodiment, the defined loss may include at least one of harm, damage, injury, death, damage to others, damage to property of others, or criminal penalties, or punishment. In a further embodiment, the thing of value may include at least one of a virtual world or a real world thing of value. In an embodiment, the transfer may be procured by the participant, or by another participant.

The system includes a computer storage medium operable to save a record of the arrangement. In an embodiment, the record of the arrangement may include at least one of a record of any provision of the benefit to the participant.

In an embodiment, the system may further include a participant interface communication link that enables the participant to access to the computer-simulated environment and participate in the risk management element. In another embodiment, the system may further include a protection entity interface communications link that enables the protection entity to access to the computer-simulated environment and participate in the risk management element.

Returning to FIG. 9, the figure illustrates another embodiment that provides a system. The system includes a computing device couplable to a virtual world via a public network. The computing device is illustrated as the computing device 600. The system also includes instructions, illustrated as the program 605. The instructions, when executed on the computing device, cause the computing device to activate a virtual character that represents a participant in the virtual world. The instructions also enable participation by the virtual character in an arrangement with a protection entity that includes the protection entity providing a compensation to the virtual character upon a future occurrence of a described loss in the virtual world in exchange for a consideration transferred to the protection entity. The instructions further make a record of the arrangement.

In an embodiment, the protection entity includes a participant protection entity. In another embodiment, the protection entity includes a non-participant protection entity.

Figure 12:
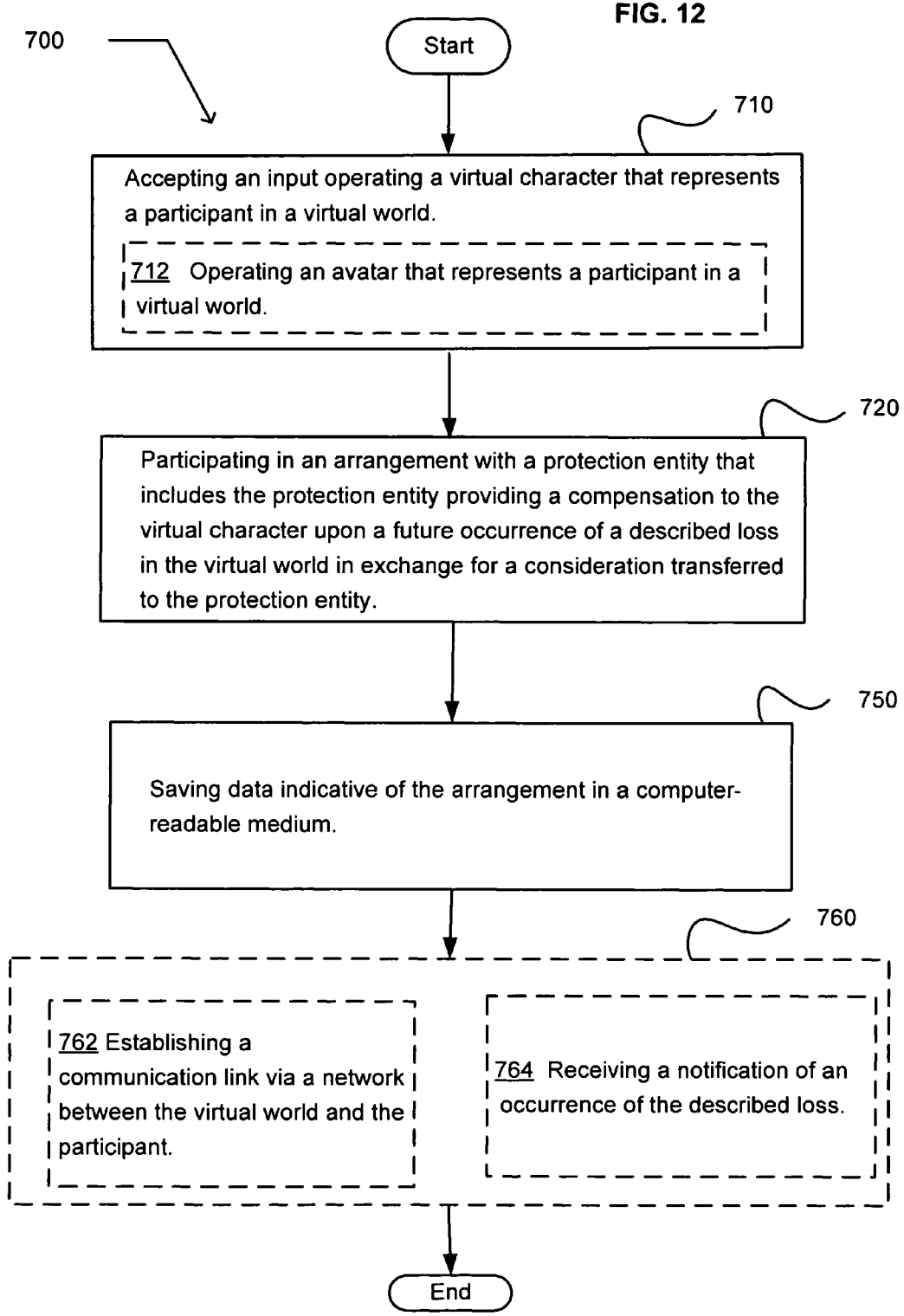
FIG. 12 illustrates an exemplary operational flow.

FIG. 12 illustrates an exemplary operational flow 700. After a start operation, the operational flow moves to a control operation 710 that accepts an input operating a virtual character in a virtual world. A negotiation operation 720 participates in an arrangement with a protection entity. The arrangement includes the protection entity providing a compensation to the virtual character upon a future occurrence of a described loss in the virtual world in exchange for a consideration transferred to the protection entity. A memory operation 750 saves data indicative of the arrangement in a computer-readable medium. The operational flow proceeds to an end operation.

In an embodiment, the control operation 710 may include at least one additional operation, such as the operation 712. The additional operation 712 includes operating an avatar that represents a participant in a virtual world.

In an alternative embodiment, the operational flow 700 may include at least one additional operation 760. An additional operation may include an operation 762 and/or an operation 764. The operation 762 includes establishing a communication link via a network between the virtual world and the participant. The operation 764 includes receiving a notification of an occurrence of the described loss.

Figure 13:
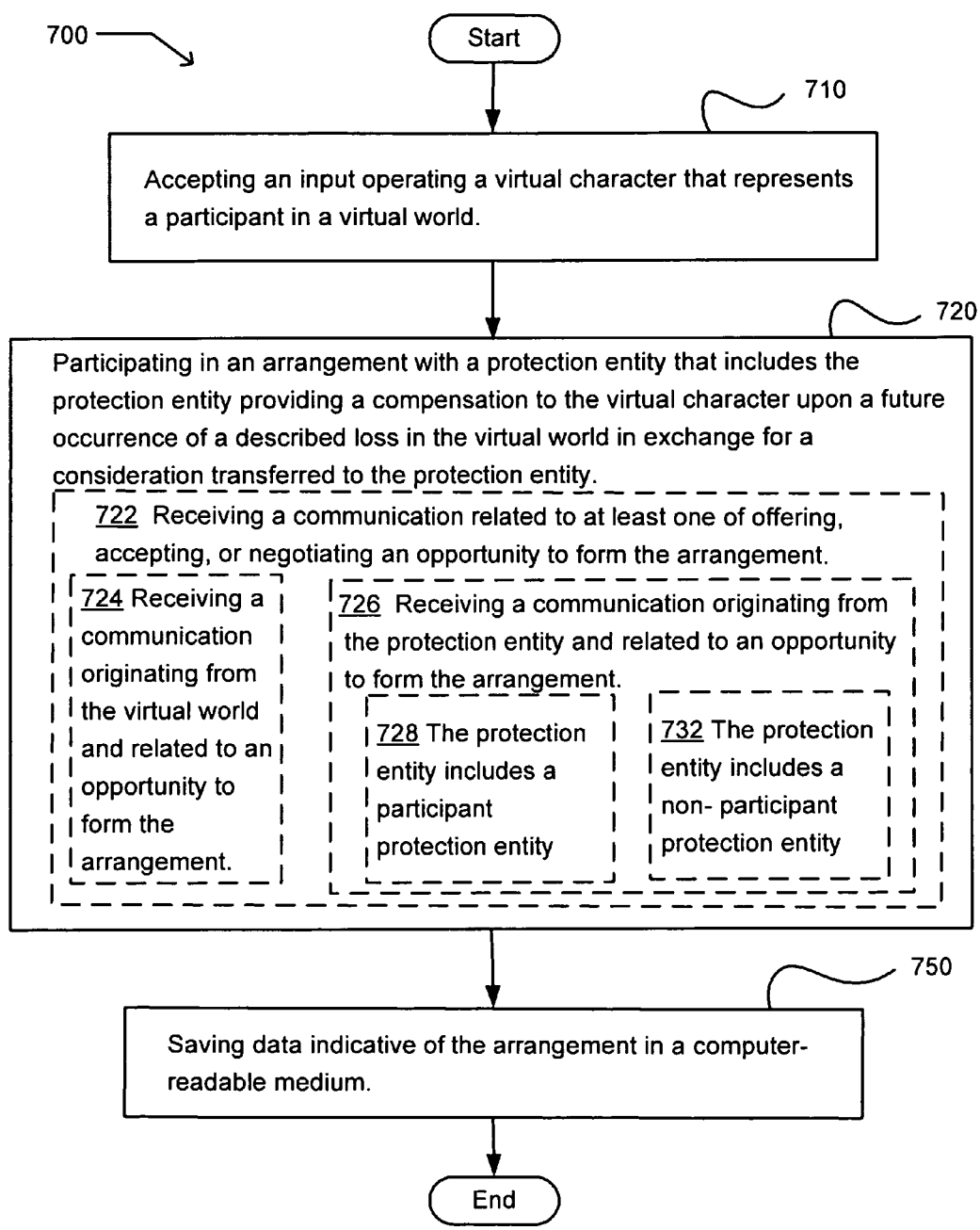
FIG. 13 illustrates an alternative embodiment of the exemplary operational flow of FIG. 12.

FIG. 13 illustrates an alternative embodiment of the exemplary operational flow 700 of FIG. 12. The negotiation operation 720 may include at least one additional operation. An additional operation may include an operation 722. The operation 722 receives a communication related to at least one of offering, accepting, or negotiating an opportunity to form the arrangement. The operation 722 may include at least one additional operation. An additional operation may include an operation 724 and/or operation 726. The operation 724 receives a communication originating from the virtual world and related to an opportunity to form the arrangement. The operation 726 receives a communication originating from the protection entity and related to an opportunity to form the arrangement. The operation 726 may include at least one additional operation. An additional operation may include an operation 728 and/or operation 732. At the operation 728, the protection entity includes a participant protection entity. At the operation 732, the protection entity includes a non-participant protection entity.

Figure 14:
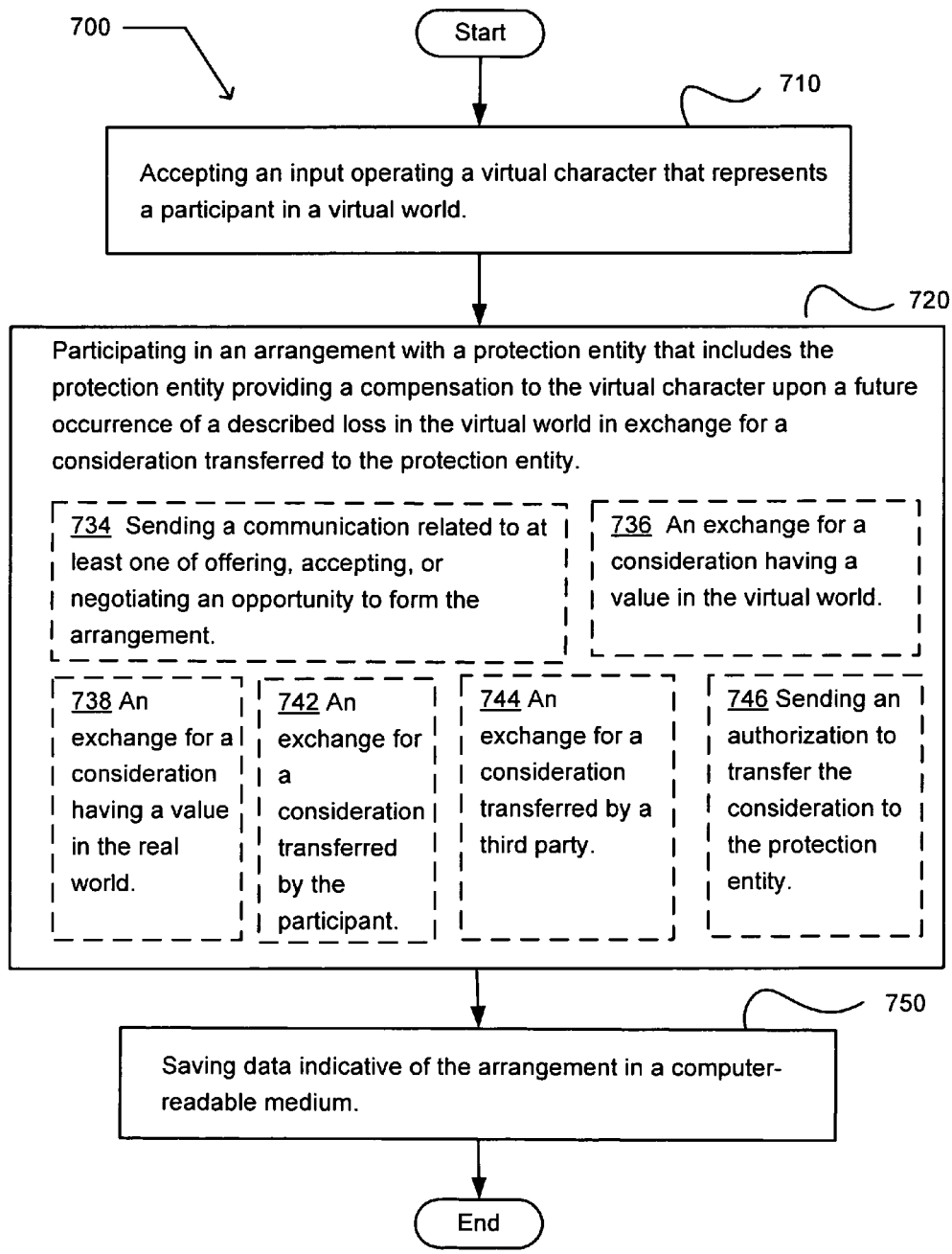
FIG. 14 illustrates another alternative embodiment of the exemplary operational flow of FIG. 12.

FIG. 14 illustrates an alternative embodiment of the exemplary operational flow 700 of FIG. 12. The negotiation operation 720 may include at least one additional operation. An additional operation may include an operation 734, an operation 736, an operation 738, an operation 742, an operation 744, and/or an operation 746. The operation 734 sends a communication related to at least one of offering, accepting, or negotiating an opportunity to form the arrangement. At the operation 736, the exchange for a consideration transferred to the protection entity includes an exchange for a consideration having a value in the virtual world. At the operation 738, the exchange for a consideration transferred to the protection entity includes an exchange for a consideration having a value in the real world. At the operation 742, the exchange for a consideration transferred includes an exchange for a consideration transferred by the participant. At the operation 744, the exchange for a consideration transferred includes an exchange for a consideration transferred by a third-party. At the operation 746, the participating in an arrangement with a protection entity includes sending an authorization to transfer the consideration to the protection entity.

FIG. 15 illustrates a partial view of an exemplary computer-program product 780. The computer-program product includes a computer program 784 for executing a computer process in a computing system. An embodiment of the exemplary computer-program product may be provided using a computer-readable signal-bearing medium 782, and includes computer executable instructions. The computer product encodes the computer program for executing a computer process. The computer process includes sending an instruction to a virtual world related to a virtual character that represents a participant. The process also includes enabling a participation by the virtual character in an arrangement with a risk distribution entity that includes the risk distribution entity providing a compensation to the virtual character upon a future occurrence of a described loss in the virtual world in exchange for a consideration transferred to the risk distribution entity. The process further includes saving data representative of the arrangement.

In another embodiment, the computer-readable signal-bearing medium 782 may include a computer storage medium 786, which may be carried by a computer-readable carrier (not shown). The computer-readable signal-bearing medium may include a communications medium 788. In an alternative embodiment, the computer program 784 may be implemented in hardware, software, and/or firmware, and/or a combination thereof.

Figure 16:
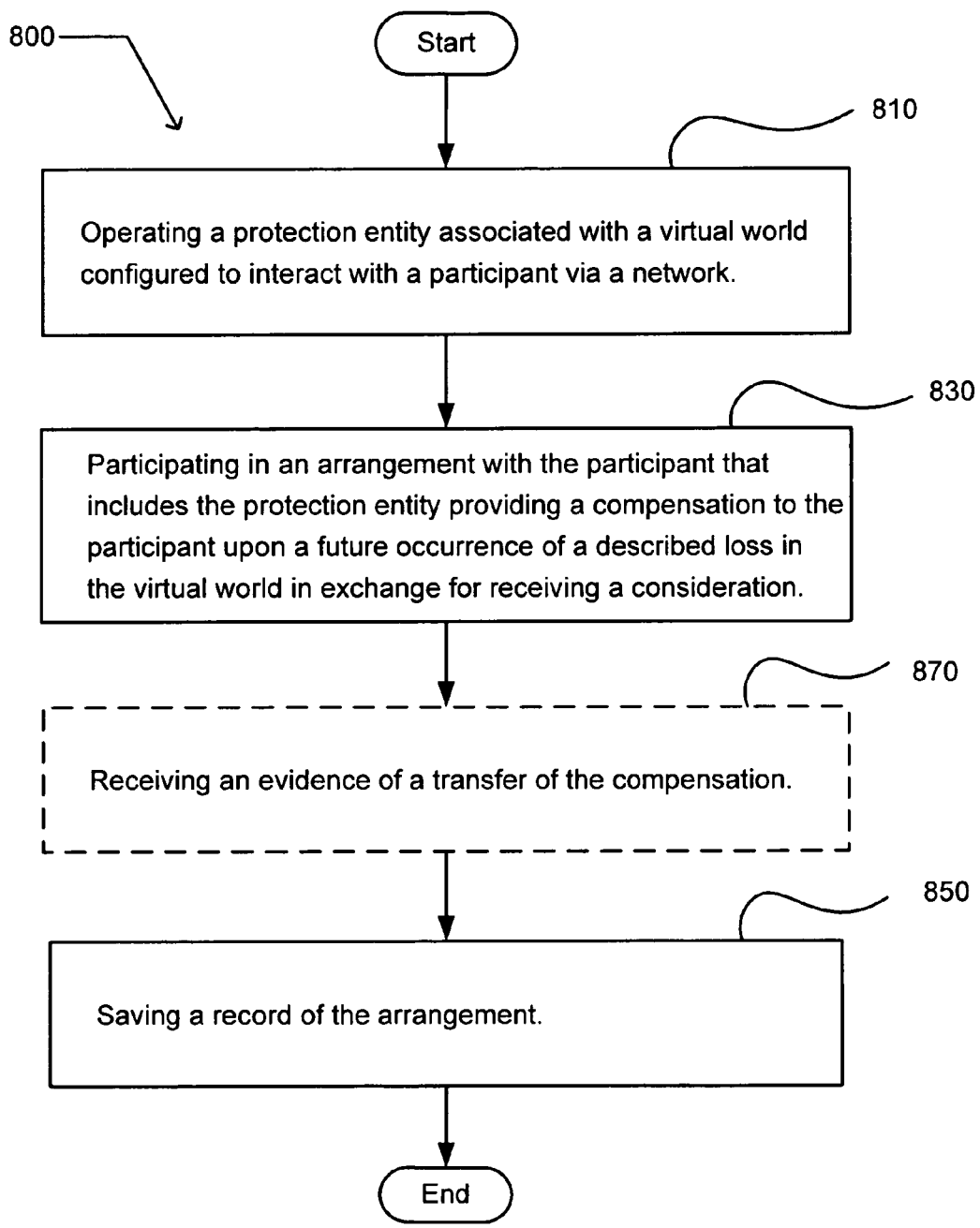
FIG. 16 illustrates an exemplary operational flow.

FIG. 16 illustrates an exemplary operational flow 800. After a start operation, the operational flow moves to an administration operation 810. The administration operation operates a protection entity associated with a virtual world configured to interact with a participant via a network. A negotiating operation 830 participates in an arrangement with the participant that includes the protection entity providing a compensation to the participant upon a future occurrence of a described loss in the virtual world in exchange for receiving a consideration. A storage operation 850 saves a record of the arrangement. The operational flow then moves to an end operation.

In an embodiment, the operational flow 800 may include at least one additional operation, such as an operation 870. The operation 870 receives an evidence of a transfer of the compensation.

Figure 17:
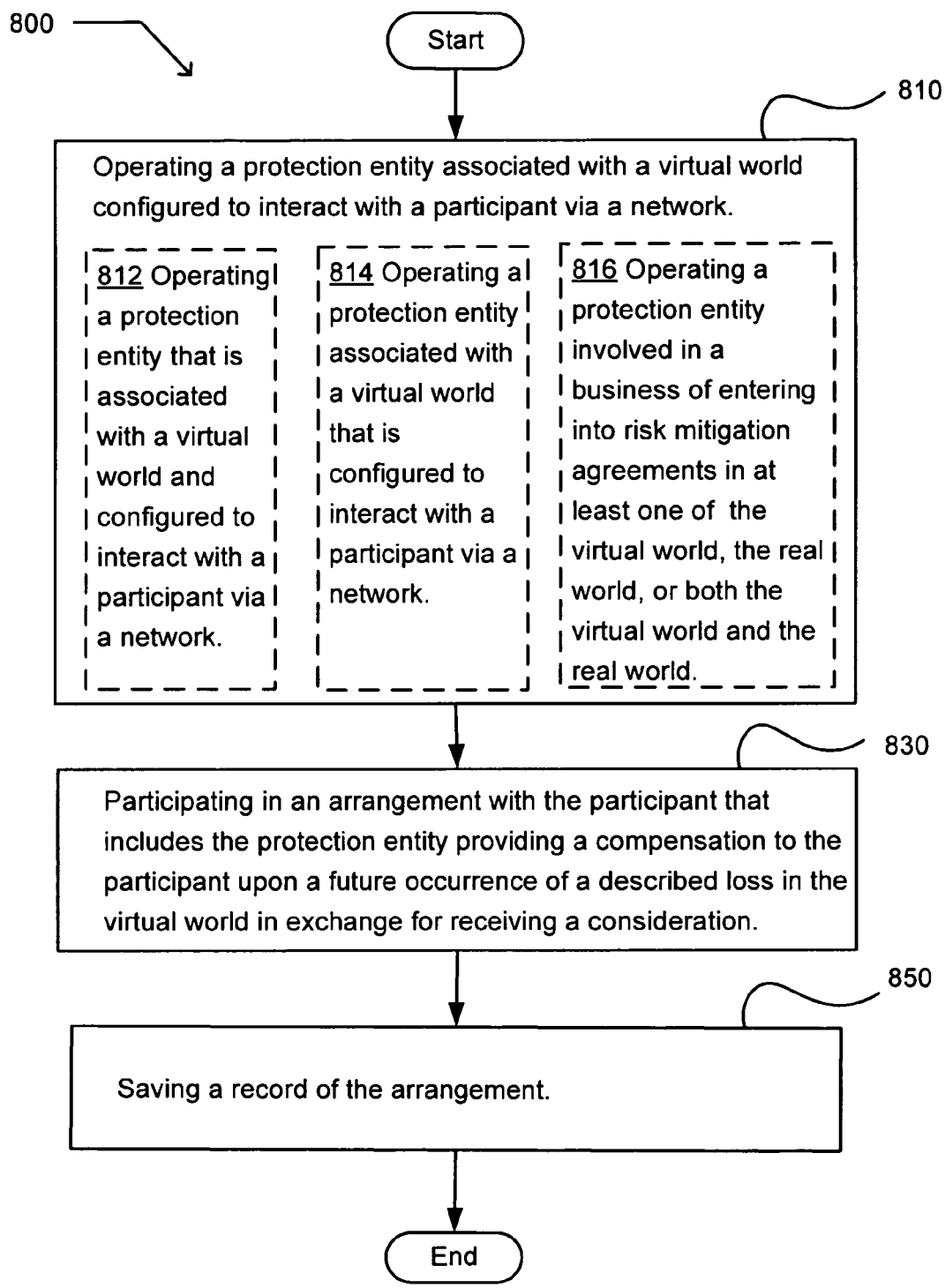
FIG. 17 illustrates an alternative embodiment of the exemplary operational flow of FIG. 16.

FIG. 17 illustrates an alternative embodiment of the exemplary operational flow 800 of FIG. 16. The administration operation 810 may include at least one additional operation. An additional operation may include an operation 812, an operation 814, and/or an operation 816. The operation 812 operates a protection entity that is associated with a virtual world and configured to interact with a participant via a network. The operation 814 operates a protection entity associated with a virtual world that is configured to interact with a participant via a network. The operation 816 operates a protection entity involved in a business of entering into risk mitigation agreements in at least one of the virtual world, the real world, or both the virtual world and the real world.

Figure 18:
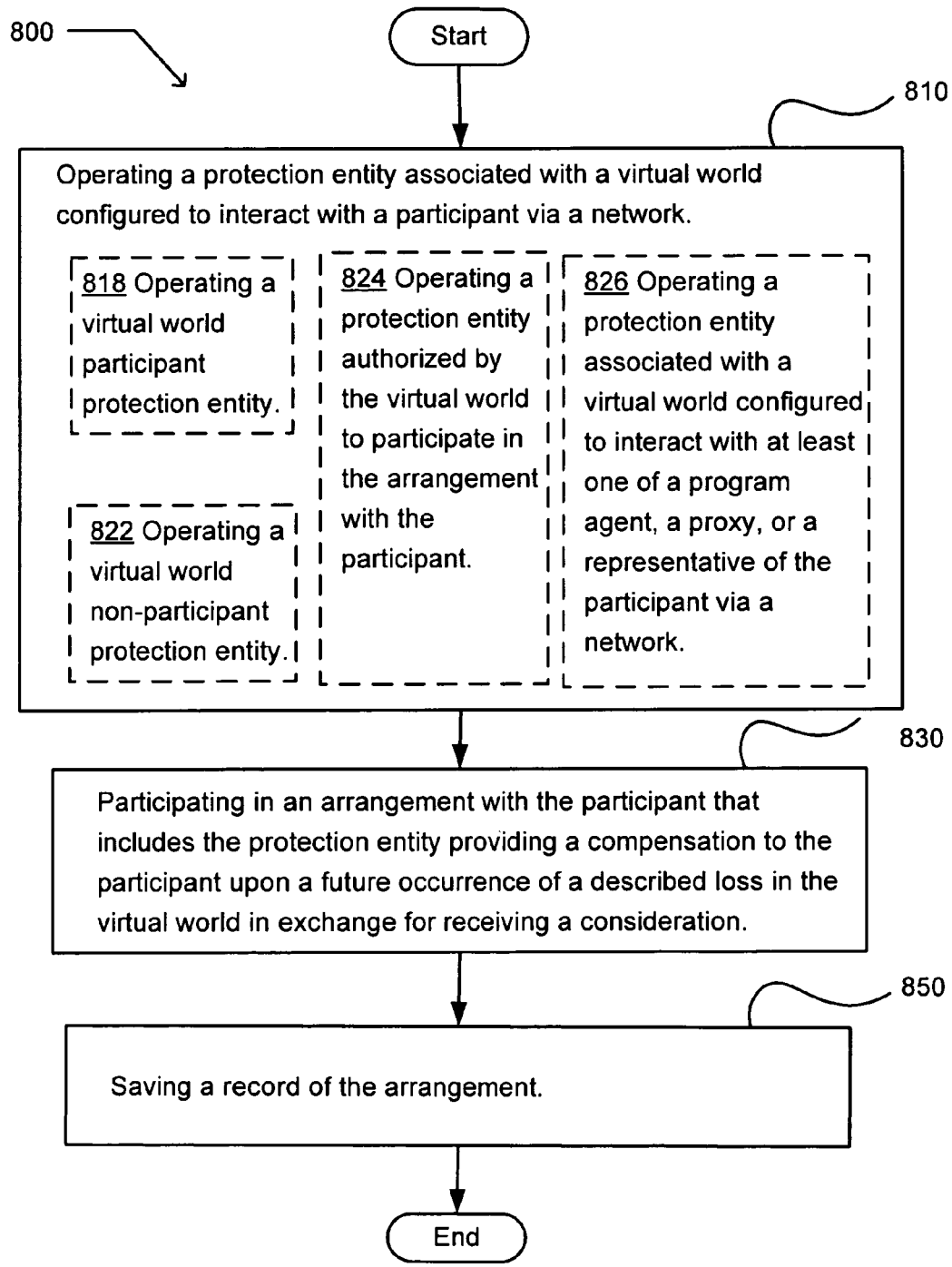
FIG. 18 illustrates another alternative embodiment of the exemplary operational flow of FIG. 16.

FIG. 18 illustrates an alternative embodiment of the exemplary operational flow 800 of FIG. 16. The administration operation 810 may include at least one additional operation. An additional operation may include an operation 818, an operation 822, an operation 824, and/or an operation 826. The operation 818 operates a virtual world participant protection entity. The operation 822 operates a virtual world non-participant protection entity. The operation 824 operates a protection entity authorized by the virtual world to participate in the arrangement with the participant. The operation 826 operates a protection entity associated with a virtual world configured to interact with at least one of a program agent, a proxy, or a representative of the participant via a network.

Figure 19:
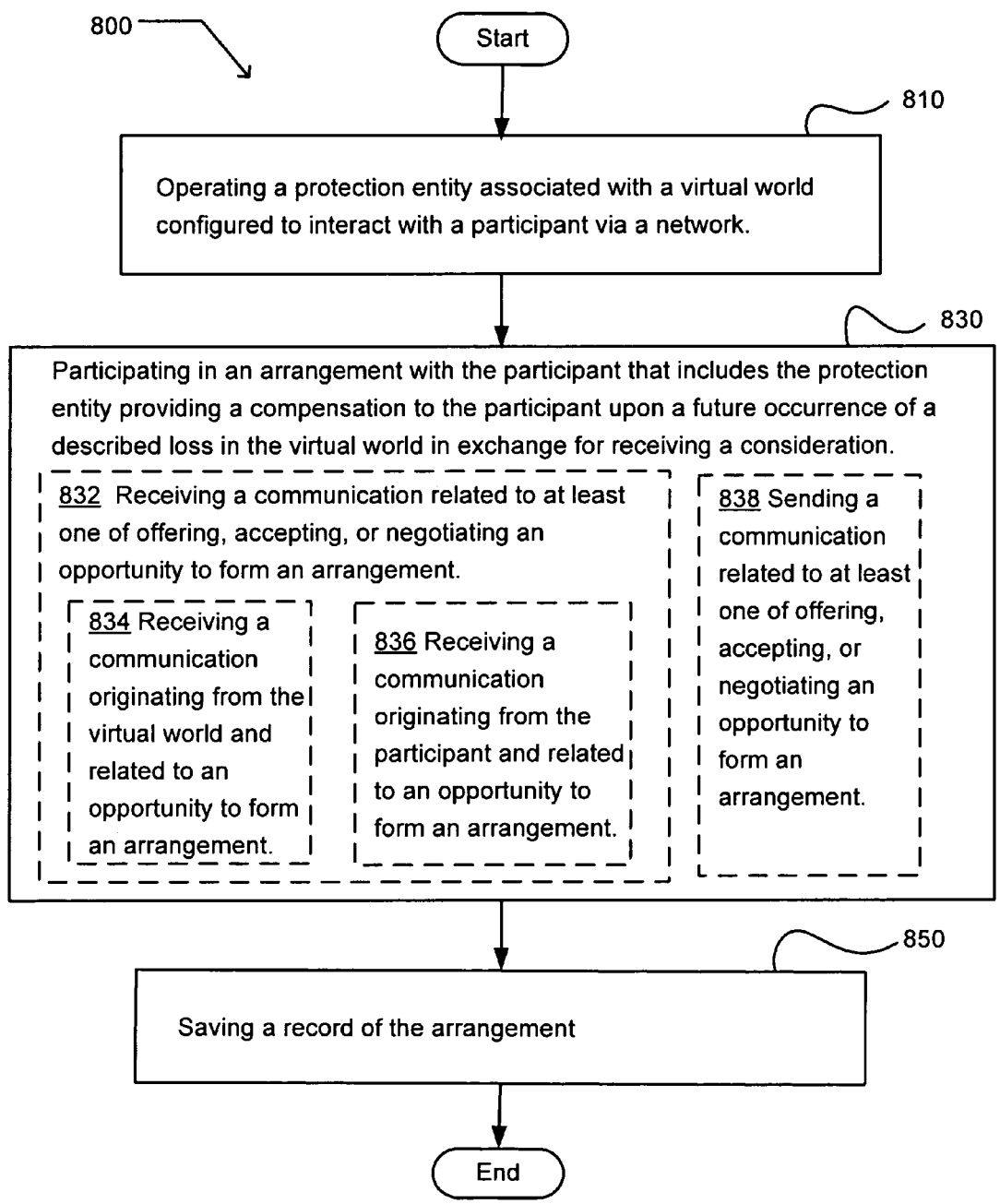
FIG. 19 illustrates a further alternative embodiment of the exemplary operational flow of FIG. 16.

FIG. 19 illustrates an alternative embodiment of the exemplary operational flow 800 of FIG. 16. The negotiation operation 830 may include at least one additional operation. An additional operation may include an operation 832, and/or an operation 838. The operation 832 receives a communication related to at least one of offering, accepting, or negotiating an opportunity to form an arrangement. The operation 832 may include at least one additional operation. An additional operation may include an operation 834, and/or an operation 836. The operation 834 receives a communication originating from the virtual world and related to an opportunity to form an arrangement. The operation 836 receives a communication originating from the participant and related to an opportunity to form an arrangement. The operation 838 sends a communication related to at least one of offering, accepting, or negotiating an opportunity to form an arrangement.

Figure 20:
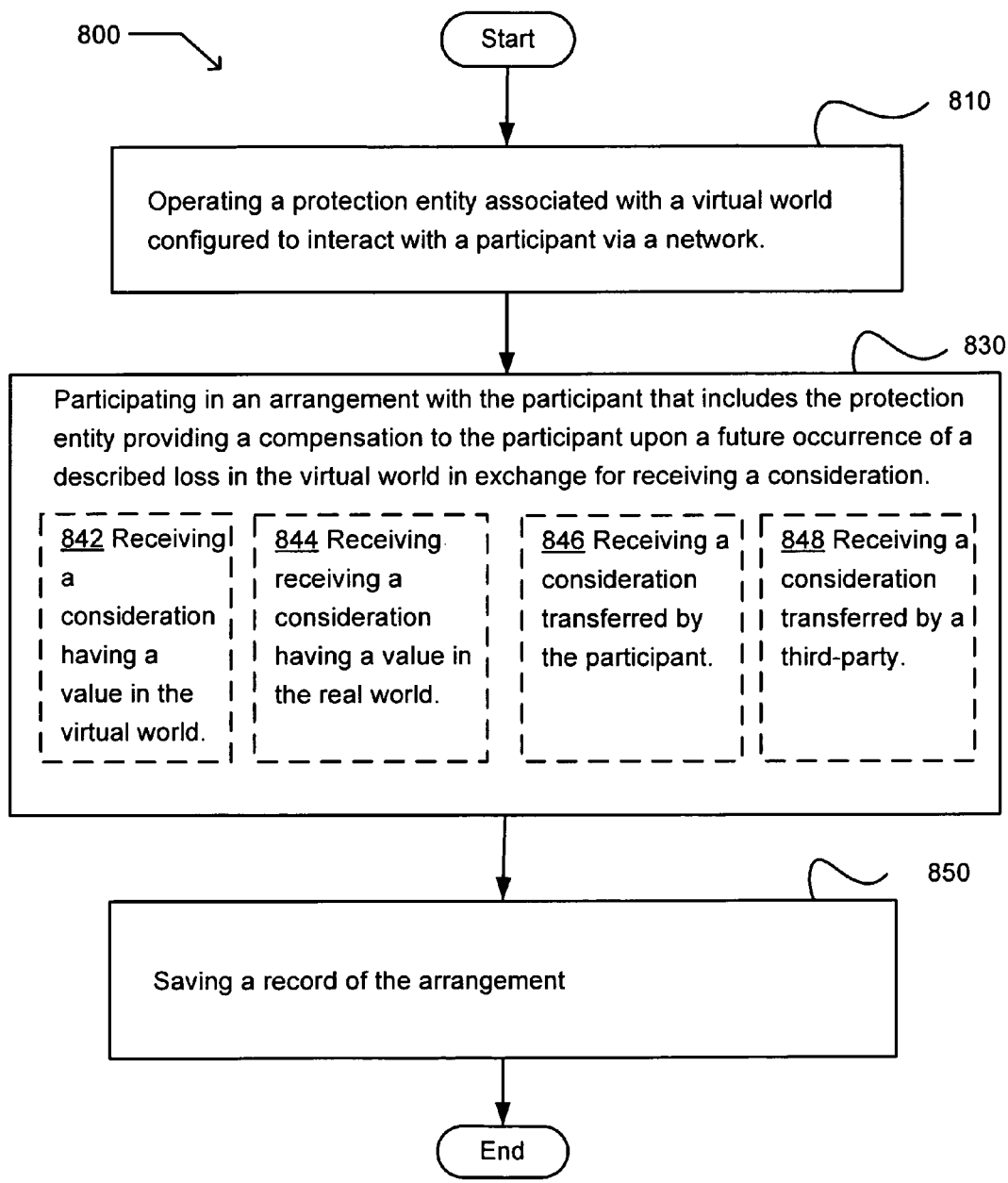
FIG. 20 illustrates an alternative embodiment of the exemplary operational flow of FIG. 16.

FIG. 20 illustrates an alternative embodiment of the exemplary operational flow 800 of FIG. 16. The negotiation operation 830 may include at least one additional operation. An additional operation may include an operation 842, an operation 844, an operation 846, and/or an operation 848. The operation 842 receives a consideration having a value in the virtual world. The operation 844 receives a consideration having a value in the real world. The operation 846 receives a consideration transferred by the participant. The operation 848 receives a consideration transferred by a third-party.

Figure 21:
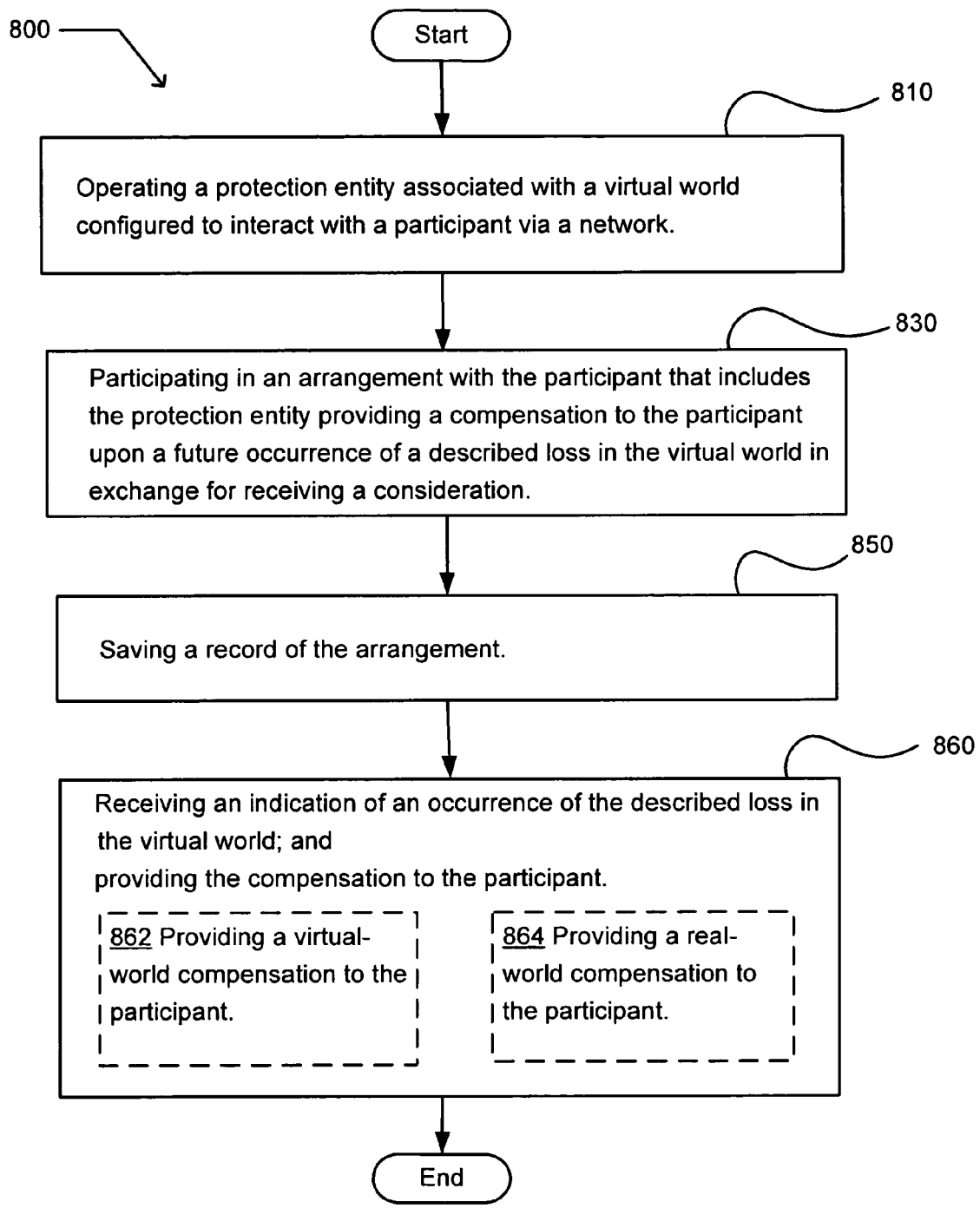
FIG. 21 illustrates another alternative embodiment of the exemplary operational flow of FIG. 16.

FIG. 21 illustrates an alternative embodiment of the exemplary operational flow 800 of FIG. 16. The operational flow includes claims operation 860 that receives an indication of an occurrence of the described loss in the virtual world, and provides the compensation to the participant. The claims operation 860 may include at least one additional operation. An additional operation may include an operation 862, and/or an operation 864. The operation 862 provides a virtual-world compensation to the participant. The operation 864 provides a real-world compensation to the participant.

FIG. 22 illustrates a partial view of an exemplary system 900. The system includes a computing system 910 that includes a computing device 920. In an embodiment, the computing system may be at least substantially similar to the thin computing device 20 of FIG. 1 and/or the computing system environment 100 of FIG. 2. The computing system includes configuration to communicate with a virtual world via a network, the virtual world including an operability to interact with a participant via the network. In another embodiment, the computing device may be at least substantially similar to the thin computing device 20 of FIG. 1 and/or the computing device 110 of FIG. 2. The system further includes computer-executable instructions 930 that when executed on the computing device cause the computing system to operate a protection entity having an association with the virtual world. The instructions further cause the computing system to participate in an arrangement with the participant that includes the protection entity providing a compensation to the participant upon a future occurrence of a described loss in the virtual world in exchange for receiving a consideration. The instructions also save data indicative of the arrangement.

In an alternative embodiment, the computer-executable instructions may include an additional instruction. Additional instructions may include instructions 932, instructions 934, instructions 936, instructions 938, and/or instructions 942. The instructions 932 operate a protection entity having a presence within the virtual world. In a further embodiment, the protection entity may be under control of the virtual world operator or a player participant. In another embodiment, the player participant may be an individual or a company. The instructions 934 operate a protection entity having a presence within the virtual world and under a control of the virtual world. The instructions 936 operate a protection entity having a presence within the real world and an operability to interact with the virtual world via the network. The instructions 938 operate a protection entity involved in a business of a risk mitigation in the real world and having an operability to interact with the virtual world via the network. The instruction 942 operate a protection entity having a presence in the real world and having an operability to interact with the participant via the network in response to a referral from the virtual world.

In an embodiment, the protection entity may include a participant protection entity. The participant protection entity may include at least one of a real-world entity, a real-world entity engaged in a business of entering into contracts similar to the arrangement, a person, an individual, a virtual-world entity, a virtual-world entity engaged in a business of entering into contracts similar to the arrangement, a fictional protection entity, or an avatar of the virtual world. In another embodiment, the protection entity may include a non-participant protection entity. The non-participant protection entity includes at least one of a provider of the virtual world, an operator of the virtual world, or a person associated with the virtual world.

FIG. 23 illustrates a partial view of an exemplary computer-program product 960. The computer-program product includes a computer program 964 for executing a computer process in a computing system. An embodiment of the exemplary computer-program product may be provided using a computer-readable signal-bearing medium 962, and includes computer executable instructions. The computer product encodes the computer program for executing a computer process. The computer process includes operating a protection entity having an association with the virtual world that includes an operability to interact with a participant via a network. The process also includes participating in an arrangement with the participant that includes the protection entity providing a compensation to the participant upon a future occurrence of a described loss in the virtual world in exchange for receiving a consideration. The process further includes saving data indicative of the arrangement.

In another embodiment, the computer-readable signal-bearing medium 962 may include a computer storage medium 966, which may be carried by a computer-readable carrier (not shown). The computer-readable signal-bearing medium may include a communications medium 968. In an alternative embodiment, the computer program 964 may be implemented in hardware, software, and/or firmware, and/or a combination thereof.

Figure 24:
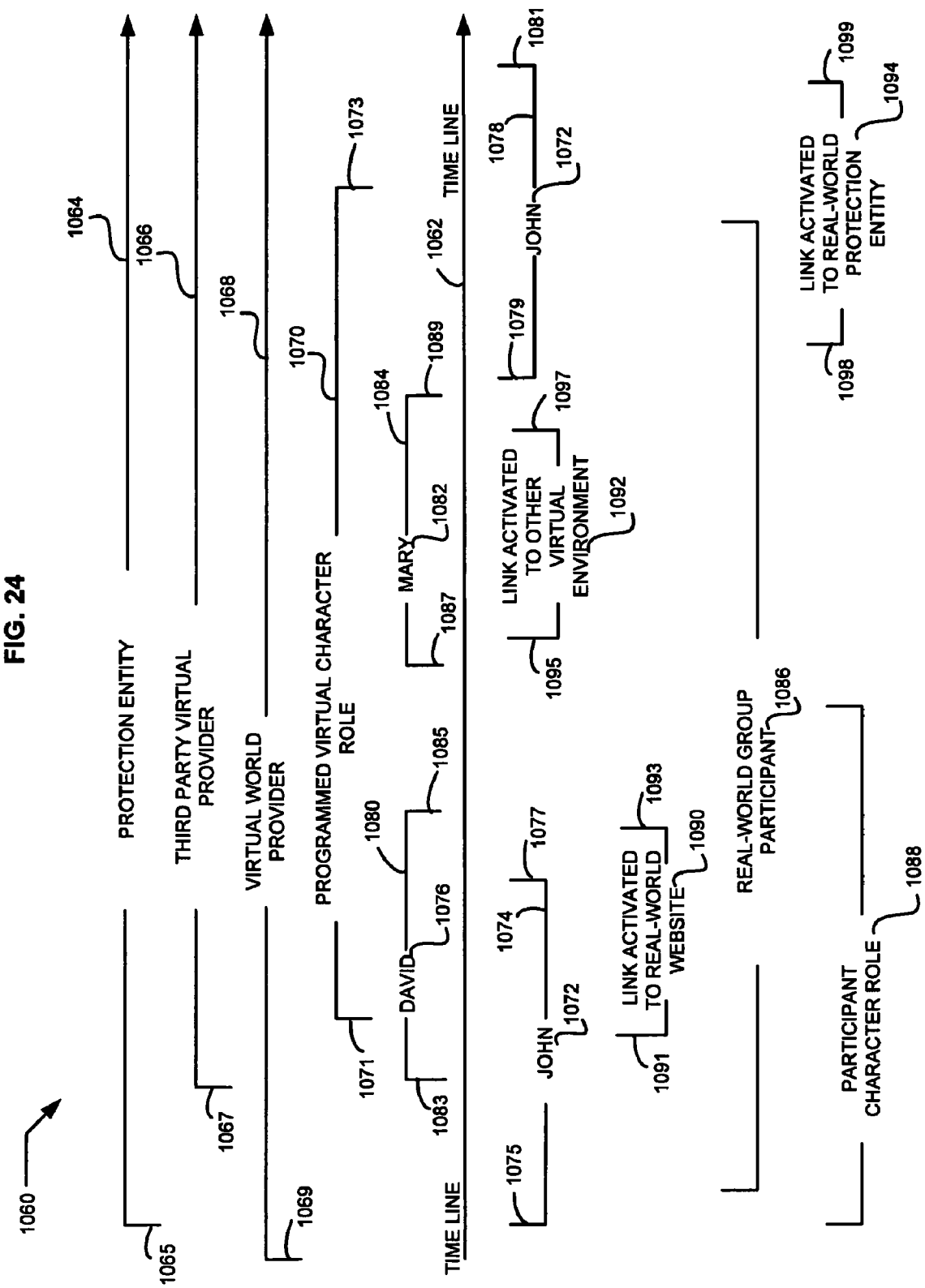
FIG. 24 illustrates an exemplary schematic timing diagram of risk management opportunities that are possible in a virtual world environment among participants and entities.

FIG. 24 illustrates an exemplary schematic timing diagram 1060 of risk management opportunities that are possible in a virtual world environment among participants and entities. A time line 1062 provides a reference for real time and delayed time accessibility for different virtual world and real-world entities, including a protection entity with an active time period 1064 commencing at 1065, a third party virtual provider with an active time period 1066 commencing at 1067, a virtual world provider with an active time period 1068 commencing at a starting time 1069, and a programmed virtual character role with an active time period 1070 commencing at time 1071 and terminating at time 1073. Because of the benefits of computerized technology, real time and delayed time interaction between entities are possible for purposes of practicing the methods and implementing the systems for virtual credit opportunities as disclosed herein.

For example, as shown in FIG. 24, a participant John 1072 having an actual logon time period 1074 commencing at time 1075 and terminating at time 1077 has the capability of having real time interaction during logon time period 1074 with participant David 1076. It is noted that David's actual logon time period 1080 commencing at time 1083 and terminating at time 1085 partially overlaps with John's logon time period 1074, and similarly with active time 1066 of the third party virtual provider, as well as with an active time period of a real-world group participant 1086. It is further noted that John's logon time period 1074 completely overlaps with active period 1064 of the protection entity, and with the active period 1068 of the virtual world provider, and further with an active period of a participant character role 1088. This enables real time interaction between entities, including repeated dialogue communications if deemed appropriate, while risk mitigation arrangements are being negotiated, arranged, implemented, transferred, resolved, and/or canceled. Of course, it is understood that time delays between real time interactive messages may also occur intentionally, or because of system limitations.

Even though John 1072 is logged off between his termination time 1077 and his re-commencement time 1079, other entities that are active or logged on during the interim period may respond to any of John's requests, actions or questions that have been appropriately stored in memory, or may pursue their own dialogue with respect to new, pending or existing risk mitigation arrangements. Such other entities may include Mary 1082 whose logon period 1084 commences at time 1087 and terminates at time 1089. Similarly, John can resume his virtual world risk mitigation arrangement participation during his new logon time period 1078 until termination at time 1081. This new period may include responses to requests, action or question previously made by Mary 1082 whose logon period 1084 does not overlap either of John's logon time periods 1074, 1078.

Further real time interaction may be initiated or received by participants or other entities in the virtual world environment through links in the virtual world environment as shown by a real-world website link 1090 activated to commence at time 1091 and terminate at time 1093, a virtual environment link 1092 activated to commence at time 1095 and terminate at time 1097, and a real-world protection entity link 1094 activated to commence at time 1098 and terminate at time 1099. It is therefore to be understood that both unidirectional and bi-directional links across a boundary between a virtual world environment and a real-world location or real-world entity may be used to facilitate, effectuate, implement, resolve, or perpetuate a risk mitigation arrangement.

As illustrated in FIG. 24, participation in a virtual world environment may include activities, events and transactions that are wholly within the simulated or virtual world environment as well as activities, events and transactions that are initiated or partly pursued in the simulated or virtual world environment. A virtual world participant or participant taking a class, for example, could mean a virtual character taking a class in the virtual world to increase his virtual world skill level, as well as a participant using his virtual character to interact with a real-world course (for example, to take an online class), or some combination of these.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost versus efficiency tradeoffs. Those having skill in the art will appreciate that there are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle may be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is defined by the appended claims.

What is claimed is:

1. A system comprising:
   (a) circuitry programmed or structured to perform particular functions pursuant to instructions of a program comprising computer-readable instructions operable to manage a virtual world configured to interact with at least two avatar players over a network;
   (b) circuitry programmed or structured to perform particular functions pursuant to a risk mitigation module operable to facilitate an arrangement that includes a risk distribution entity providing a benefit to an avatar player of the at least two avatar players upon an occurrence of a defined loss in the virtual world in exchange for a consideration that includes a virtual item having a substantial value and being provided by the avatar player of the at least two avatar players and in compliance with the terms of the arrangement, wherein the risk distribution entity includes an entity that distributes a virtual world risk of the defined loss among a plurality of avatar players;
      (i) wherein the defined loss in the virtual world is a defined loss of the avatar player; and
      (ii) wherein the risk mitigation module is operable to facilitate at least one of forming the arrangement, facilitating an interaction between the avatar player of the at least two avatar players and the risk distribution entity, creating the arrangement, negotiating a term of the arrangement, revising the arrangement, and resolving of disputes related to the arrangement; and
   (c) a computer storage medium operable to save a record of the arrangement.

2. The system of claim 1, wherein the at least two avatar players includes:
   at least two avatar players who control their respective virtual identity in the virtual world.

3. The system of claim 2, wherein the at least two avatar players who control their respective virtual identity in the virtual world include:
   at least two avatar players who control their respective virtual identity having at least one attribute in the virtual world.

4. The system of claim 3, wherein the at least one attribute includes:
   at least one of an attribute native to the virtual world, an attribute acquired from a source not native to the virtual world, an attribute created by another avatar player of the at least two avatar players, an attribute created by a third party, a weapon, a property, an asset, and/or an item.

5. The system of claim 1, wherein the network includes:
   at least one of a private computer network or a public computer network.

6. The system of claim 1, wherein the network includes:
   the Internet.

7. The system of claim 1, wherein the risk mitigation module operable to facilitate an arrangement includes:
   a risk mitigation module operable to facilitate at least one of, transferring the consideration, transferring a right of the avatar player of the at least two avatar players in the arrangement, memorializing the arrangement, and notifying regarding matters relevant to the arrangement.

8. The system of claim 1, wherein the risk distribution entity includes:
   an avatar player risk distribution entity.

9. The system of claim 8, wherein the avatar player risk distribution entity includes:

at least one of a real-world entity, a real-world entity engaged in a business of entering into contracts similar to the arrangement, a person, an individual, a virtual-world entity, a virtual-world entity engaged in a business of entering into contracts similar to the arrangement, a fictional risk distribution entity, or an avatar of the virtual world.

10. The system of claim 1, wherein the risk distribution entity includes:
a non-avatar player risk distribution entity.

11. The system of claim 10, wherein the non-avatar player risk distribution entity includes:
at least one of a provider of the virtual world, an operator of the virtual world, or a person associated with the virtual world.

12. The system of claim 1, wherein the providing a benefit to an avatar player of the at least two avatar players includes:
providing a virtual-world benefit to the avatar player of the at least two avatar players.

13. The system of claim 1, wherein the providing a benefit to an avatar player of the at least two avatar players includes:
providing a real-world benefit to the avatar player of the at least two avatar players.

14. The system of claim 1, wherein the providing a benefit to an avatar player of the at least two avatar players includes:
providing a compensation to the avatar player of the at least two avatar players.

15. The system of claim 1, wherein the providing a benefit to an avatar player of the at least two avatar players includes:
providing an agreed upon benefit to the avatar player of the at least two avatar players.

16. The system of claim 1, wherein the providing a benefit to an avatar player of the at least two avatar players includes:
providing a predetermined benefit to the avatar player of the at least two avatar players.

17. The system of claim 1, wherein the providing a benefit to an avatar player of the at least two avatar players includes:
providing a benefit determined relative to a circumstance existing at an occurrence of the loss.

18. The system of claim 1, wherein the providing a benefit to an avatar player of the at least two avatar players includes:
providing a benefit that is a function of an avatar player of the at least two avatar players attribute and/or an environmental attribute measured at an occurrence of the loss.

19. The system of claim 1, wherein the providing benefit to an avatar player of the at least two avatar players includes:
providing an attribute replacement to the avatar player of the at least two avatar players.

20. The system of claim 19, wherein the providing an attribute replacement to an avatar player of the at least two avatar players includes:
providing at least one of a replacement of an attribute, a resurrection of a virtual identity of the avatar player of the at least two avatar players in the virtual world, a replacement of a virtual-world property, a payment of a virtual-world fine, and a satisfaction of a virtual-world punishment.

21. The system of claim 1, wherein the loss includes:
a determinable contingency.

22. The system of claim 1, wherein the loss includes:
at least one of loss occurring by reason of a harm, an injury, a death of the avatar player of the at least two avatar players, a death of another avatar player, a damage, a casualty, a disability, and an imposed punitive obligation.

23. The system of claim 1, wherein the loss includes:
a loss relative to a subject matter of the arrangement in which the avatar player of the at least two avatar players has an interest.

24. The system of claim 1, wherein the consideration includes:
a virtual-world consideration.

25. The system of claim 24, wherein the virtual-world consideration includes:
a virtual-world money.

26. The system of claim 24, wherein the virtual-world consideration includes:
at least one of an attribute, a right, a body part, a weapon, or a token.

27. The system of claim 1, wherein the consideration includes:
a real-world consideration.

28. The system of claim 27, wherein the real-world consideration includes:
a real-world money.

29. The system of claim 1, wherein the consideration includes:
a consideration provided by another avatar player of the at least two avatar players.

30. The system of claim 1, wherein the computer storage medium operable to save a record of the arrangement includes:
a computer storage medium operable to save at least one of a record of a conveyance of the consideration to the protection entity, a record of the avatar player of the at least two avatar players assenting to the arrangement, a record of the risk distribution entity's assent to the arrangement, a record of an occurrence of the loss, or a record of any provision of the benefit.

31. The system of claim 1, wherein the computer storage medium operable to save a record of the arrangement includes:
a computer storage medium.

32. The system of claim 1, further comprising:
a monetary module operable to manage a medium of exchange in the virtual world expressed as a virtual-world currency unit.

33. The system of claim 32, wherein the virtual-world currency unit includes:
a virtual-world currency having a value in the virtual world and facilitating an exchange for goods and services.

34. The system of claim 33, wherein the virtual-world currency having a value in the virtual world and facilitating an exchange for goods and services includes:
a virtual-world currency having a value in the virtual world and usable as at least one of the consideration and the benefit.

35. The system of claim 1, wherein the virtual-world further comprises:
a native virtual-world medium of exchange expressed as a native virtual-world currency unit having a value in the virtual world; and
the system further comprises a monetary module coupled with the virtual world, subject to control of another avatar player of the at least two avatar players, and operable to manage a secondary virtual-world medium of exchange expressed as a secondary virtual-world currency unit having a value in the virtual world and facilitating at least one of the benefit and the consideration.

36. The system of claim 35, wherein the monetary module coupled with the virtual world includes:

a monetary module coupled with the virtual world and subject to control of the virtual world.

37. The system of claim 35, wherein the monetary module coupled with the virtual world includes:
a monetary module coupled with the virtual world and subject to control of another avatar player of the at least two avatar players.

38. The system of claim 37, wherein the monetary module coupled with the virtual world and subject to control of another avatar player of the at least two avatar players includes:

a monetary module coupled with the virtual world and subject to control of an avatar player risk distribution entity.

39. The system of claim 35, wherein the secondary virtual world currency includes:
a secondary virtual world currency having a value in another virtual world.

* * * * *

UNITED STATES PATENT AND TRADEMARK OFFICE
CERTIFICATE OF CORRECTION

PATENT NO.        : 8,096,882 B2                     Page 1 of 1
APPLICATION NO.   : 11/191252
DATED             : January 17, 2012
INVENTOR(S)       : Edward K. Y. Jung et al.

It is certified that error appears in the above-identified patent and that said Letters Patent is hereby corrected as shown below:

In the Claims

In Column 26, Line 49, Claim 4 please delete text "third party, a weapon, a property, an asset, and/or an" and replace with --third party, a weapon, a property, an asset, or an--

Signed and Sealed this
Eleventh Day of March, 2014

Michelle K. Lee
*Deputy Director of the United States Patent and Trademark Office*